US010719541B2

(12) United States Patent
Foresti

(10) Patent No.: US 10,719,541 B2
(45) Date of Patent: *Jul. 21, 2020

(54) METHOD AND SYSTEM TO CAPTURE AND FIND INFORMATION AND RELATIONSHIPS

(71) Applicant: Stefano Foresti, Denair, CA (US)

(72) Inventor: Stefano Foresti, Denair, CA (US)

(73) Assignee: Stefano Foresti, Denair, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 14/471,614

(22) Filed: Aug. 28, 2014

(65) Prior Publication Data

US 2014/0373133 A1      Dec. 18, 2014

Related U.S. Application Data

(63) Continuation-in-part of application No. 13/615,340, filed on Sep. 13, 2012, now Pat. No. 8,825,697.

(60) Provisional application No. 61/595,693, filed on Feb. 7, 2012, provisional application No. 61/534,203, filed on Sep. 13, 2011, provisional application No. 61/871,226, filed on Aug. 28, 2013.

(51) Int. Cl.
*G06F 21/31* (2013.01)
*G06F 16/9535* (2019.01)
*G06F 16/335* (2019.01)

(52) U.S. Cl.
CPC ........ *G06F 16/337* (2019.01); *G06F 16/9535* (2019.01)

(58) Field of Classification Search
CPC . G06F 17/30864–867; G06F 17/30893; G06F 11/1448; G06F 11/1451; G06F 2201/84; G06F 16/9535; G06F 16/337
See application file for complete search history.

(56) References Cited

U.S. PATENT DOCUMENTS

| 8,090,621 B1* | 1/2012 | Chakrabarti | G06Q 30/0601 705/26.1 |
| 8,239,287 B1* | 8/2012 | Smith | G06Q 30/0241 705/26.1 |
| 2004/0111530 A1* | 6/2004 | Sidman | G06F 17/3089 709/245 |
| 2005/0193093 A1* | 9/2005 | Mathew | G06Q 30/02 709/219 |
| 2005/0216452 A1* | 9/2005 | Teague | 707/3 |

(Continued)

*Primary Examiner* — James Trujillo
*Assistant Examiner* — Kurt A Mueller

(57) ABSTRACT

A method and system to improve the computer in light of the global information network with numerous computer devices services, and apps, so that a user can capture and find information with high security and usability. The method improves capturing information and the user intentions, while minimizing the work that needs to be done by the user to obtain a benefit from the computer system. The invention includes the following methods for the computer: to simplify account creation for new users; to identify them progressively by requesting just the information necessary to provide a service; to authenticate an identity without a priori preparation of security questions and by requesting a user an effort proportional to the value of the service; and to capture the user intentions of permission of information by progressively and interactively asking who can and must not find it.

6 Claims, 15 Drawing Sheets

(56) References Cited

U.S. PATENT DOCUMENTS

| | | | |
|---|---|---|---|
| 2005/0289356 A1* | 12/2005 | Shoham | G06F 17/30702 |
| | | | 713/183 |
| 2006/0173985 A1* | 8/2006 | Moore | G06F 17/3089 |
| | | | 709/223 |
| 2007/0208755 A1* | 9/2007 | Bhatkar | G06F 21/31 |
| 2008/0243632 A1* | 10/2008 | Kane | G06F 17/30867 |
| | | | 705/14.66 |
| 2008/0243637 A1* | 10/2008 | Chan | G06Q 30/02 |
| | | | 705/26.1 |
| 2008/0243815 A1* | 10/2008 | Chan | G06F 17/30867 |
| 2008/0275755 A1* | 11/2008 | Brustein | G06Q 30/02 |
| | | | 705/7.34 |
| 2008/0294617 A1* | 11/2008 | Chakrabarti | G06F 17/30867 |
| 2009/0006374 A1* | 1/2009 | Kim | G06F 17/30699 |
| 2009/0132459 A1* | 5/2009 | Hicks | G06Q 30/0269 |
| | | | 706/52 |
| 2009/0133110 A1* | 5/2009 | Kumar | H04L 29/12122 |
| | | | 726/8 |
| 2009/0241040 A1* | 9/2009 | Mattila | G06F 3/0481 |
| | | | 715/760 |
| 2010/0042608 A1* | 2/2010 | Kane, Jr. | G06F 17/30867 |
| | | | 707/732 |
| 2010/0070526 A1* | 3/2010 | Matias | 707/770 |
| 2012/0030190 A1* | 2/2012 | Lee | G06F 17/30876 |
| | | | 707/711 |
| 2012/0110096 A1* | 5/2012 | Smarr | G06Q 10/10 |
| | | | 709/206 |

\* cited by examiner

Fig. 8

0900 — Authenticate with Q & A of information in the account of this ID!

0901 — ID: +19876543210 reset  0906
START  0905

0910 — Are these facts true or false? Are they part of captures in the account by the ID you claim ownership?

| | what | when | who |
|---|---|---|---|
| 0912 — TRUE  FALSE | word identifier | 2014-07-05T16:21:04 | — 0911 |
| 0913 — TRUE  FALSE | wishes to you | | J.S. |
| TRUE  FALSE | file.doc | 2014-07-15T09:29:43 | |

0914 — Select true or false for each of the questions. once you submit, your total score is used to authenticate you own the ID!

reset  0916
SUBMIT  0915

0920 — Enter a set of facts, captured in the account by the ID you claim ownership!

0921 — what    when    who

0922 — ENTER FACT 1:

ENTER FACT 2:

ENTER FACT 3:

0924 — Once you entered each fact, submit so they get searched in the account and verified if they are true to authenticate you own the ID!

reset  0926
SUBMIT  0925

0950 — You have authenticated ownership of ID:    +19876543210

0960 — You failed to authenticate ownership of ID:    +19876543210 reset  0966

0970 — More Q & A is needed to authenticate ownership of ID:    +19876543210 reset  0976
START  0975

*Fig. 9*

METHOD AND SYSTEM TO CAPTURE AND FIND INFORMATION AND RELATIONSHIPS

CROSS-REFERENCE TO RELATED APPLICATIONS

This application is a continuation-in-part of U.S. Utility patent application Ser. No. 13/615,340, filed Sep. 13, 2012, which claimed benefit of U.S. Provisional Patent Application Ser. No. 61/534,203, filed Sep. 13, 2011, and Provisional Patent Application Ser. No. 61/595,693, filed Feb. 9, 2012. It also claims benefit of Provisional Patent Application Ser. No. 61/871,226, filed Aug. 28, 2013. Those prior applications are hereby incorporated by reference.

BACKGROUND

In parent application Ser. No. 13/615,340, I described a solution to the problem generated by the explosion of information, devices and apps: it is ever harder to find information in context. Digital information surely cannot be found if it was lost or not captured by the computer in first place. First, while humans think of relationships among pieces of information, these may be hard or impossible to get captured by the computer with current apps: important input from humans is lost. Second, digital information gets replicated and scattered around devices, apps, accounts, and people, resulting in the loss of important relationships among who-what-when.

In this application I further describe how to improve the computer to capture and find information, in light of two key factors of the global information network with numerous computer devices services, and apps: security and usability. These are conflicting objectives: maximize the security, while minimizing the work that needs to be done by the user to obtain a benefit from the system. Services and apps require separate identification and authorization, so that users waste time to create and access accounts of the various services.

Account creation and identification: a user is requested to perform many unnecessary actions as a condition to use a service, and worse than that, to even find out what it does. For instance:
  User name: choosing a user name for a service forces the user to do multiple trials and errors to find an available name. Some services allow using existing IDs (e.g. an email address) in order to create an account, which may resolve the burden of finding an available user name, but it may affect the user privacy, in case she did not want to reveal her identity or unnecessary information about herself yet.
  Password: the rules for composing passwords may vary from service to service leading users to frustration, and weak or forgotten passwords.
  User information: additional user information (e.g. name, sex, etc.) may be required before account creation; since it may not be validated, users may enter bogus data.
  Recovery: selecting among a set of predetermined questions and answers for account security or recovery is frustrating and ineffective as setting up a password.
The impact to users is as follows:
  new users, have to waste a lot of time to set up and give up too much privacy, even if they may just want to see if a service is what they want or not;
  existing users are aggravated by remembering and changing passwords, and setting up security and recovery information, that may not be proportional to value to the service they receive or to the value of information they produce in the service.
The impact to service providers is as follows:
  new users or potential new customers may be turned off, existing legitimate users are aggravated, and may fail to access the service,
  bogus information and accounts may be collected,
  abusers are not discouraged and have more opportunity for holes.
In summary, security is costly and burdensome: if unusable, users bypass, complain or leave.

Permissions to digital information. The status quo is based on sharing. Also, users have multiple services and communication channels that they use for access control. As a result, users produce an enormous amount of information that gets disaggregated and may not be associated with the intended permissions: some information may be accessed by unintended users, while other information is not findable by users that were not intended to be blocked. A user can share to selected people, or groups, or publicly, and results in situations where either privacy, or search, or both fail. For instance:
  I send content to one person: it is only searchable by this person, though I really have no intention to prevent others from finding it . . . but they can't.
  I want to share confidential content only with selected people, but have no way to know whether it gets in the hands of others . . . and it may.
  I want to search available content by a person, so I ask to send it to me . . . burdensome.
In summary, the following problems are at the core of the invention:
  security rules may not be proportional to the value being protected;
  the user's investment in time to meet security guidelines may not be proportional to the value received by the service, or to the assets that are being protected;
  users are offered an experience that may not allow to express their intentions; With "frictionless security" I indicate a series of methods to achieve the following objectives:
  Immediate user benefit: the computer should provide immediately the service benefits (especially to a new user) to show its value: this will in turn induce the user to engage and use the system more and more. Otherwise, the user may get frustrated, and interrupt trying to use the system at the first hurdle, and not come back again.
  Optimize security and usability: make the effort of the user minimal, and anyway proportional to the value of the service they receive, or to the value of information they produce in the service, while maximizing the security likelihood of the service and information.
  Privacy/anonymity: allow people to maintain as much privacy or anonymity as possible and identify themselves to the computer service as much as necessary for what they need from the service. Again, if too much is asked of them, they may not engage. So the computer needs to postpone asking the user what is not immediately necessary.
  Capture the user intentions: support and capture the intentions of the user and the trade-offs between security and time to invest. This includes what they want to permit or not about the information that they capture, or that is collected about them.

Limit abuse: limit resources at stake, and attribute responsibility if the limits are broken, but without aggravating legitimate users.

BRIEF SUMMARY OF THE INVENTION

The frictionless security system improves the computer by maximizing security while minimizing the impact to the user. The user's user effort should be as little as possible, and proportional to level of security chosen by the user. The concepts of the invention improve the computer security and user experience at the same time, to identify, authenticate, permit, and authorize users to digital information and the services offered by the computer. The frictionless security uses the following parameters to provide usable security with a managed risk approach: time available, value of information or task, undesired consequences, effort required.

Setupless Account.

A user does not have to set up an account in order to use and experiment the service, but is assigned, without user intervention, an ID and relative credentials with which to immediately use the service. The user may keep this identification and relative credentials for future access, if she wants.

Progressive Identification.

The user can provide the computer service with IDs that were previously issued by identification entities (and relative authentication credentials) if and when those are needed to obtain additional benefits from the service; for instance, accessing information that is permitted only to a certain ID requires the user to prove ownership of such ID. The user can keep using the ID that was assigned by the computer, or authenticate proof of ownership of another ID.

Progressive Authentication.

The computer authenticates an identification provided by the user, by testing the user for the knowledge of information that was associated to the account of that ID. The testing process can be proportional to the value of the account, so that the user does not have to prepare unnecessary a-priori security and recovery information at account creation. The time and effort of testing can be proportional to the security that the user wants.

Identity Aggregation.

A user can provide to the computer multiple IDs and relative credentials to be authenticated, in order to aggregate information of such IDs, or the benefits and actions provided by the service to such IDs.

Progressive Expression of Permission.

A user is provided by the computer a progressive and interactive process to express the intention about how to permit or block access to specific information, and to fully capture the intention of the user about who can or must not access it.

DESCRIPTION OF THE DRAWINGS

FIG. 5 shows the process of authenticating or registering an ID to be signed-in.

FIG. 8 shows the practical results for a user having linked multiple IDs, and viewing aggregated data captured as multiple IDs.

FIG. 9 shows the progressive authentication of a user, by testing knowledge of the information associated to the claimed identification.

DETAILED DESCRIPTION

Figures 1, 2:
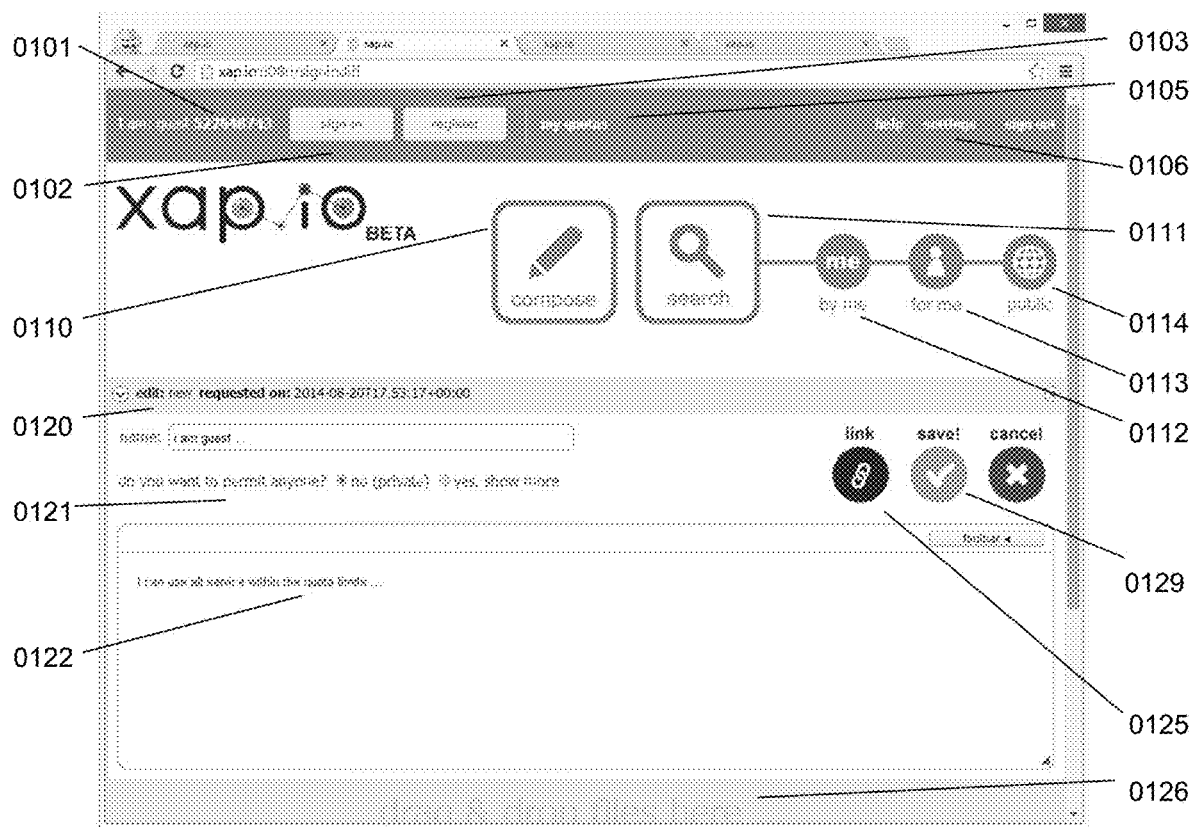
FIG. 1 shows an embodiment of the computer service when a yet unidentified user arrives to its entrance is assigned an ID (or new guest token) so it can immediately use the service.
FIG. 2 shows content captured by a new user before identifying herself.

The frictionless security strategy is for the computer to use a set of tactics to learn about the user, and to interact with her according to her identification. The possibilities for a user interacting with the computer service are as follows.

New User (Unidentified).

This is a user who may not know anything about the service (first time she runs or clicks) and may want to look around in a private manner, since she wants to check it out and get a feel. The computer service wants to engage her, and show the benefits of the service before asking for identification, or else she may waste time, not experience the value from the service, and be turned off. As a result, the user would leave the service. Instead, the frictionless security invention is for the computer to interact with the user as follows:

- enable her to try the service in its entirety, and experience all the benefits (up to predetermined service quotas, such as limits in time, repetition, or resources used, etc. to prevent abuse);
- keep track of all was done by her, which will be associated to a newly generated identity;
- try to engage her to identify herself with other IDs and information, but not imposing anything, or putting unnecessary roadblocks;

The new user can do one of the following things:

- leave the service without providing any identification external to the system session, or
- provide some information, e.g. an email, phone, credit card, or other identification (progressive identification).

Returning Identified User.

The user returns to the service ready to provide an existing ID:

- a guest ID previously assigned by the computer service, or
- an ID from an external service associated to an authentication method (like email verification link, phone text message, government issued IDs, etc.).

In this case, the computer service can use information previously recorded by this user in the service, or from third party services. This is the desired scenario of user retention, and to offer added value. This is also the goal of a computer service: to drive a user to identify first, before doing something in the computer service.

Returning Unidentified User.

This is the scenario where a user returns to the computer service: she had used the service, to search or generate (capture) information, but she does not know the previously generated ID (via this service or other external IDs). In practice, she does not remember the credentials (e.g. ID and/or password). The user would like to retrieve her stuff generated in the previous session: the way to authenticate her is for the computer to ask a series of questions about what has been recorded the service, in order to prove that she knows it (progressive authentication). As a result, the computer can make a risk assessment about whether the user is who she says she is. This returning unidentified user can do the following (same as a new user):

- go away without providing any form of identification external to the system session, or
- provide some information, e.g. an email, phone, credit card, or other identification.

Returning User, not Wanting to be Identified.

A user returns to the service, where she had previously provided an identity. However, this time she wants to access it without being recognized, maybe to look around, maybe to capture content with privacy concerns. The computer service does not know, and so it treats her like a new user, and assigns a new ID. However, the returning user knows about the system: hence, engagement is not a problem now, and the computer service creates a separate profile without knowing it is the same user. It is acceptable to let a user create a new profile without complications, unless there are other reasons for the service to prevent it.

Setupless Account

The concepts of setupless account was introduced in the description of the web user interface to the system, and is incorporated by reference of U.S. patent application Ser. No. 13/615,340. The setupless account indicates the method used by the computer to assign a new global unique identification (ID) to a new user, without user intervention. The computer assigns an ID:

- when a user signs out the session (e.g. without closing the app, browser, etc.);
- when a session is generated (opening a browser or app that does not cache identification).

The computer also assigns and presents, without user intervention, a temporary password, or other method that can be requested in the session by the user, in order to enable the user to return to the service or open a new session and access the account associated with the new global unique identification, by remembering the relative credentials.

As a result, a user does not have to set up an account in order to use and experiment the service, but is assigned, without user intervention, an identification (or token) with which to immediately use the service. The user may keep this guest ID for future access, if she wants, and may ask (or be presented) a password, which can be used to present the credentials for authenticating the ID in the future. The user may produce information in the account related to this new ID, and is able to return and find all information and access the services associated with it, if the relative credentials are presented and authenticated.

Figure 3:
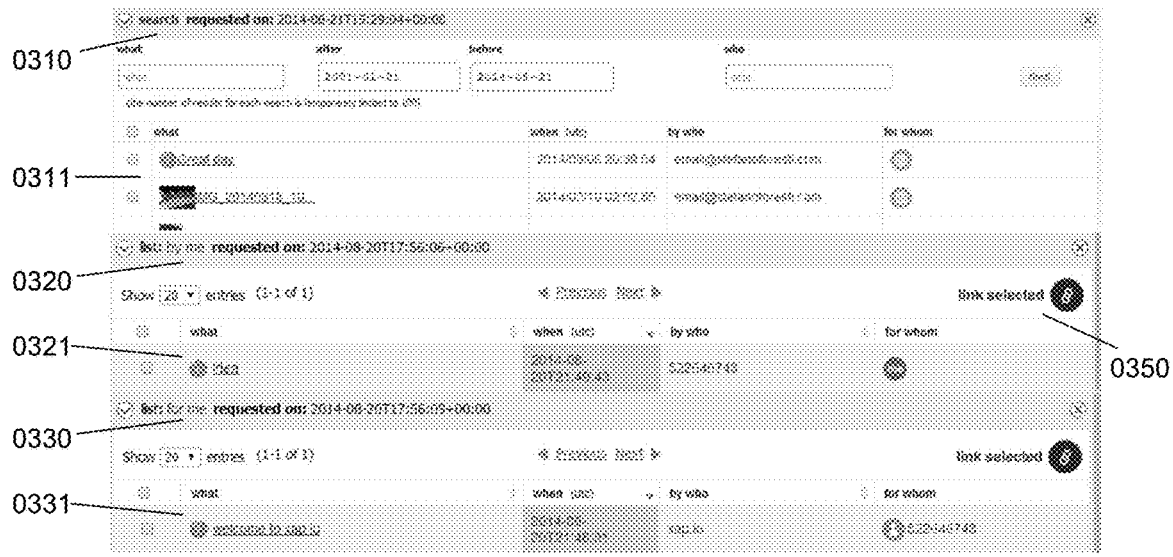
FIG. 3 shows searches and results of content accessible by the new user.

FIG. 1 shows an embodiment of the computer service when a user arrives to its entrance (e.g. home page on the web, or home screen for a mobile). An ID (or new guest token) 0101 is generated and can be immediately visible or otherwise accessible by the user. A sign-in option 0102 is also presented, which would lead this user, in case she were a returning user willing to identify herself and sign-in with a previously registered ID, or if she was a new user willing to register 0103 (this or any other ID) to be a returning user in the future. The user, currently with new ID 0101 can immediately use the service to both capture information (e.g. compose, photo, etc.) 0110 or to search 0111 (including preset searches 0112, 0113, 0114). In the specific scenario screen captured in FIG. 1 the user had selected to compose 0110, is entering information 0122 in the editor 0120, and may do other actions like set permissions 0121, link to information 0125, or drag and drop 0126. The "save" 0129 performs the immutable webification of the capture of the content 0122 (incorporated by reference of U.S. patent application Ser. No. 13/615,340), and in this example is shown in FIG. 2 with a viewer 0200 of the captured content 0201 (the final content after composing 0122). The user is presented (after the capture of new content) an option 0250 to register the identity (same action as the one triggered by 0103), in order to find such information in the future (taking to the registration described in FIG. 4). FIG. 3 shows the result of a user searching. By selecting 0111 a view 0310 of a list of results 0311 that are permitted to her, including public captures. The captures 0321 that were just saved by the user with this guest ID of the session 0101 are shown in a view 0320, which may have been triggered by clicking 0112 ("by me"). Likewise, the captures 0331 by others which were permitted specifically to this guest ID 0301 (equal to 0101) in the session are shown in a view 0330, which may have been triggered by clicking 0113 ("for me"). Any or all of these items in the lists 0311 0321 0331 could be immediately used and linked with 0350.

The process of setupless account is applicable to services in a web browser or in client applications such as a computer or mobile app. In the case of the web browser, the guest ID and password may be assigned by the server, and served to the browser application. In the case of the computer or mobile app, the guest ID and password may be generated by the client application and are eventually communicated to the server for future interaction. The new global unique identification can also be assigned to be permanent, to be disposable (i.e. not recovered if credentials are lost), or valid for limited time.

The ID of a person (PID or ID) is for the computer a snapshot of information captured of a person at a certain time: this is the same as an information capture. The PID is treated in the same way as the identity of an information object (XID) as incorporated by reference of U.S. patent application Ser. No. 13/615,340. Because both an ID of a person or an ID of an immutable capture are IDs of information, they are treated in a similar manner in this invention and they are used interchangeably. A user ID such as an email address, mobile phone number, or any issued identification from services or governments are treated in the same manner. A unique ID of a person can be assigned at the server or at the client device, even if disconnected from the internet: the ID may be synchronized to the server or other clients later. This method supports a process of generating IDs that is decentralized and not dependent on the availability of connections to the server at all times. In essence, the computer treats users as unique identifiers, and in turn, unique identifiers are a snapshot of a person at a certain time. A person that can prove to be or own that snapshot (ID) will be treated as the same user as previously authenticated with that ID. This also has impact to the security of information permissions. Users may intend to permit something to someone. However, the computer records the permission to a PID, which is a snapshot of a person. The following scenarios may happen:

- the permitted ID was expressed with a mistake, resulting in potentially an unwanted person to prove ownership of such IID.
- the ID used for a permission has not been claimed yet by a user: if someone will prove that ID in the future, she will be able to access what is permitted to her.

This is very different from email, whereby a message to an unregistered or unclaimed ID (email address) bounces and is not received. In this invention, if an information capture is permitted to an ID that has not been claimed or authenticated yet, it will be findable by that ID if authenticated in the future.

Progressive Identification

The progressive identification indicates the method of the computer to enable a user to present and authenticate an existing ID and relative credentials, after having used a new user (guest) ID. The computer allows the user to register her existing ID, and keep using the service along with all information so far generated as a guest with a new global unique ID. The computer authenticates the existing identification with the service that created it, using the relative credentials presented by the user, and (if successful) the existing identification is associated to the new guest ID.

At this point, the computer can provide the user to set a password of her choice to authenticate the existing ID in the future. The user can provide the computer service with IDs that were previously issued by identification entities, if and when those are needed to obtain additional benefits from the service; for instance, accessing information that is permitted only to a certain ID requires the user to prove ownership of such ID. The user can keep using the unique global ID that was assigned by the computer (and the relative credentials) or provide another ID with relative credentials. If successfully authenticated, the user finds all information and accesses the services associated with the new global unique identification or the existing identification were that user to return to the service after signing out or closing the session.

A user may not want to release now, or ever, a previously defined (external) identity. But it is likely that many will provide some identity if it's requested gracefully. There will be some users that will never want to release an identity, and this invention supports this scenario too. The system lets a user do something and in the meantime facilitate the process of disclosing an existing identity or other user information: the system requires identification only if necessary to achieve certain actions, or to obtain additional service quotas. In any case, the system keeps track of the ID that has assigned to her, and in case she is willing to provide another identity, all information can be aggregated for her with her permission. In other words, this is the situation where someone wants to do something in the service, but does not want to give an ID to try. In the future, she may give an existing ID, so that it is combined with the ID assigned by our system, or she will in practice validate the ID assigned by the system to use the service, so it's identified internally to the system. Of course, the ID that was assigned has to be authenticated, e.g. with the password that was assigned and she has to remember.

Figure 4:
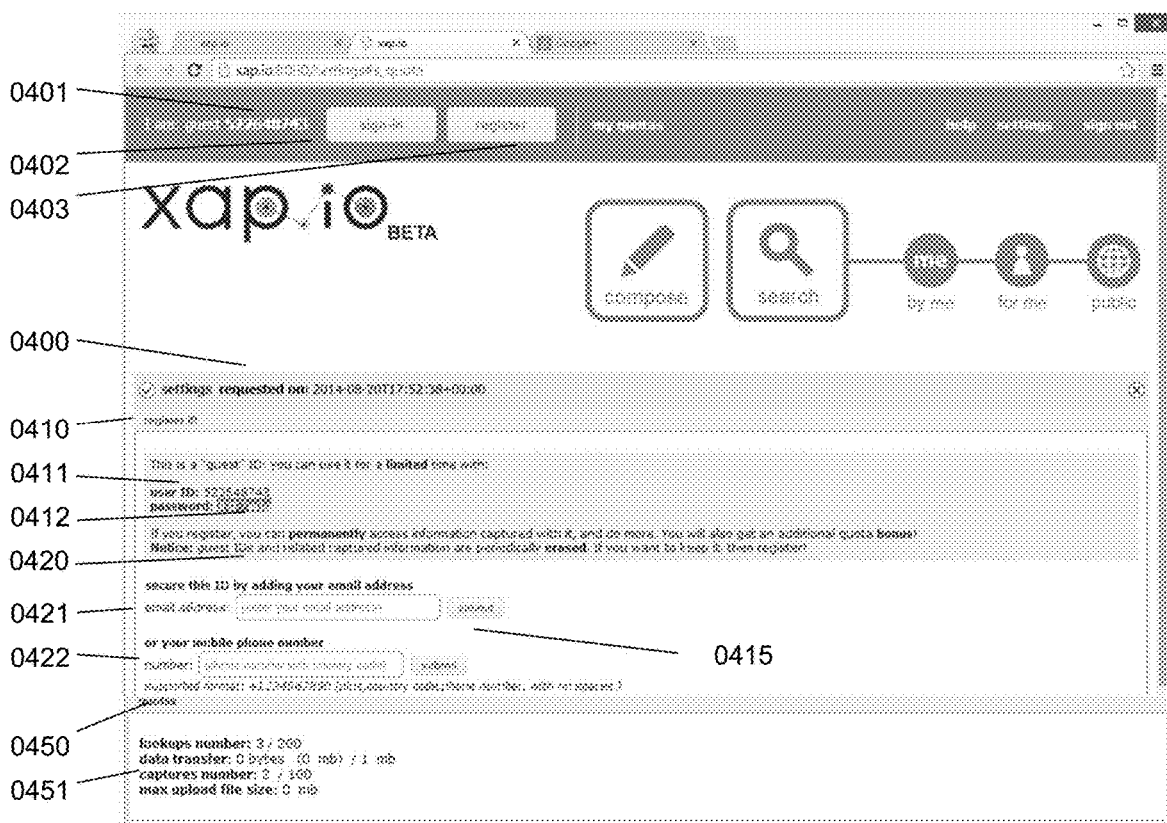
FIG. 4 shows the screen to view the credentials of the guest ID, and to register this ID or another ID.

FIG. 4 shows the registration screen 0400 where the password 0412 generated by the computer system (and associated to the ID 0411) are presented to the user, in order to provide a means for her to return and authenticate this identity and find such information that was just created. In addition, there is the option to register 0420 this new ID with an ID that the user may already have, and possibly provided by an external identification service, including an email address 0421 or a phone number 0422. The user would activate the registration process by submitting either 0421 or 0422 with a submit button 0415. There is also an instruction 0420 to notify the user that she has to remember this ID if she wants to find this information again in the future, and encourage her to register. The registration 0400 and the instructions 0420 can be reached via the register option 0403, 0103, and also when capturing content 0250. An embodiment of quotas 0450 shows that the new unidentified user has the ability to use all features and services, including writing notes and capturing files; the resources may have limits including 0451 bandwidth, storage, lookups, capture, file sizes, but could include any feature or quantity that can be measured by the service. The difference between an unidentified or identified user may be in the size of predetermined quotas that are set. For instance, a new unidentified user (guest ID) has smaller bandwidth than an identified user, and even smaller than a paying user.

Figure 5:

FIG. 5 shows the verification message 0500 that gets sent when the user registers with an email address 0421 upon submit 0415: it contains a verification link 0501 and a verification code 0502 also for another way to verify an ID such as phone number 0422. The sign-in screen 0550 in case a user wants to sign in with previously generated ID 0551 and a password 0552, whether this is a previously generated, so no longer new, global unique ID, or any ID where the user can authenticate the relative credentials. The user may have arrived at 0550 selecting 0102 or other pointers for voluntary sign in. Finally, the user whether verifying registration 0501, or signing in with an authenticated ID 0550 is signed in with that ID 0599. When a user registers with an external ID as in 0421 or 0422, such external ID is associated to the global unique ID that was assigned by the computer system to the new user, as shown on 0601 and 0611. Other and multiple existing IDs can be linked as described in the section of identity equivalence in an equivalent process as the registration form a new global identifier with an existing ID.

Figure 6:
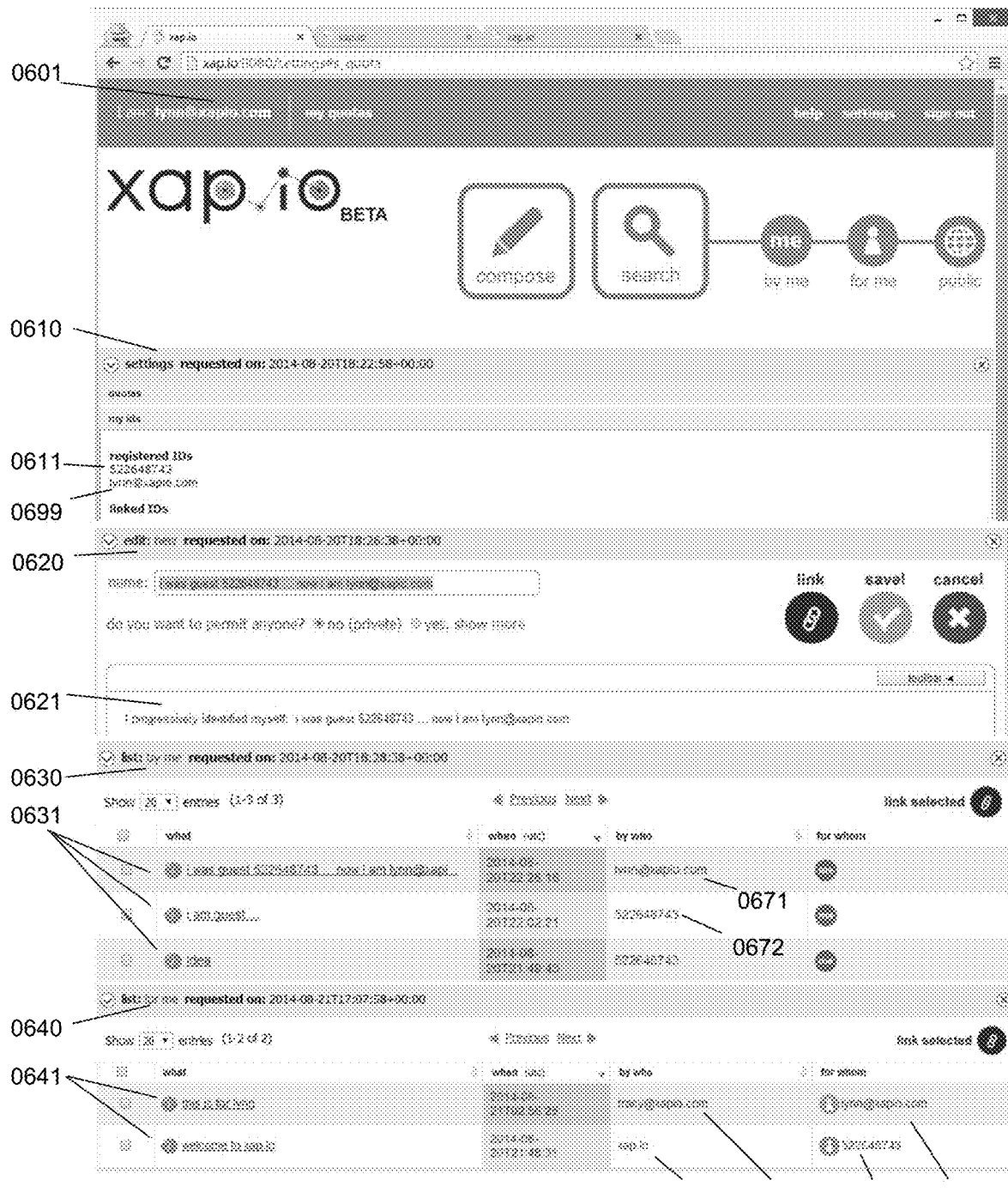
FIG. 6 shows the practical results for a user having registered and viewing data captured before and after registering.

FIG. 6 shows that the user is now identified with the chosen existing ID 0699, which is displayed in 0601 and 0699, and new actions will be recorded and information attributed to such authenticated ID 0601 (no longer the guest ID 0611), including as an example the new capture in the editor 0620 with content 0621. The viewer 0630 shows the results of searches of content generated by the user (by me); the list of results 0631 contains older captures by 0671 and newer captures by 0672, which are IDs now linked. The viewer 0640 shows the results 0641 of searches of content permitted to the user (for me). Among them, it is possible to see a combination of captures by different IDs 0681 and 0682, permitted to the original guest ID 0691 and then the registered ID 0692.

Identity Linking

A user can provide proof of ownership of multiple IDs in order to aggregate the information of such IDs, or the benefits and actions provided by the service to such IDs.

Figure 7:
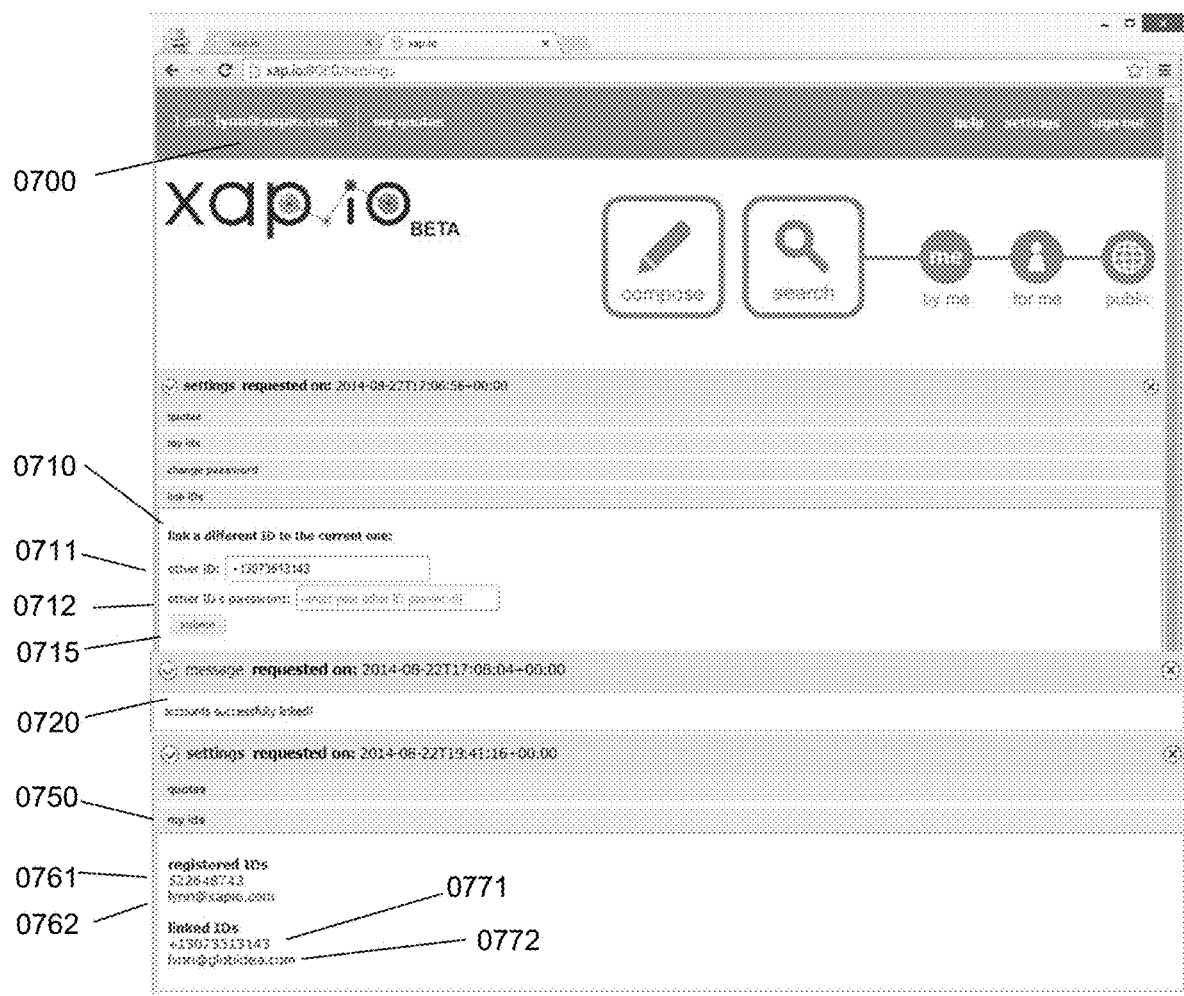
FIG. 7 shows the process for the computer system to enable the user linking multiple IDs.

FIG. 7 shows the process for the computer system to enable the user aggregating multiple IDs. A user with authenticated ID 0700 selects to link another ID 0710 to the current ID, and inputs such other ID 0711 and the relative credentials for its authentication, such as a password as in the embodiment 0712. Once the user submits the request 0715, the computer system authenticates and (if successful) associates in the meta-base the IDs and confirms success 0720 to the user. In case the credentials are incorrect, the IDs are not linked. The successfully linked ID 0711 is added to the list of previously linked IDs, as shown in the example of 0750, where the authenticated ID 0700 (equal to 0762), and the original guest ID 0761, are linked to 0771 (which is equal to what was input in 0711), and another ID that was linked earlier 0772.

Figure 8:
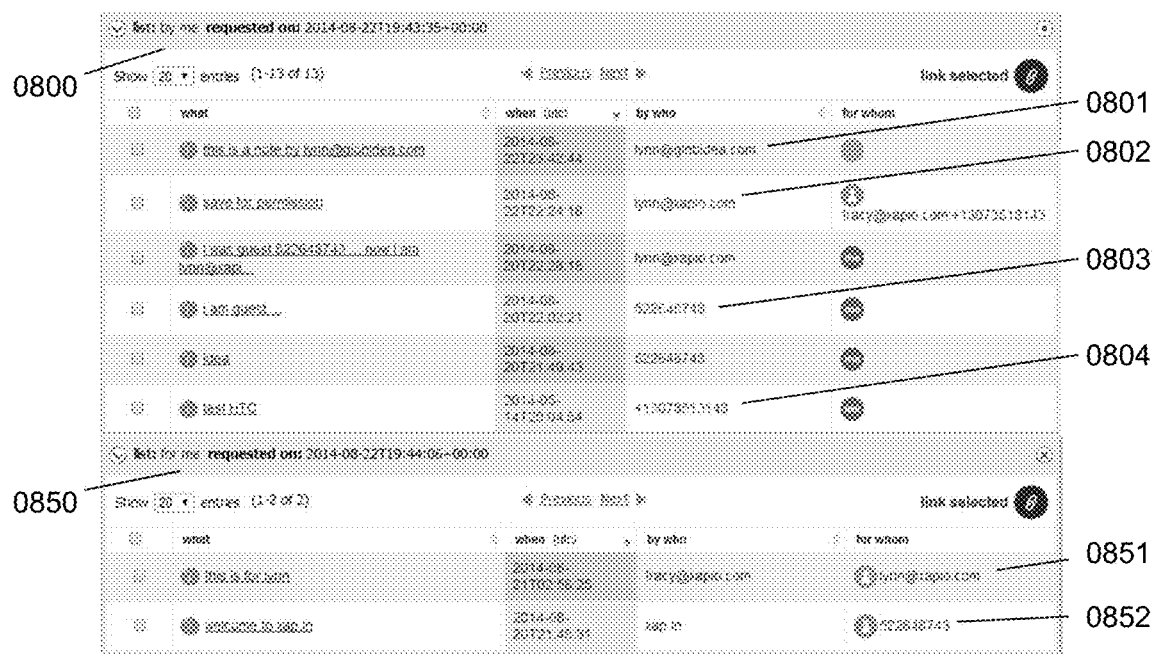

FIG. 8 shows the practical results for a user having linked IDs: the computer system, in response to a search for content captured by the authenticated ID, returns a list of results ("by me" 0800) that were captured by any of the linked IDs 0801, 0802, 0803, and 0804. Similarly, the computer system, in response to a search for content captured with permission to the authenticated ID, may return a list of results ("for me" 0850) that were captured for any of the linked IDs (in this particular example, there are only 0851 and 0852, because there may not be captures for the other linked IDs).

Progressive Authentication

Progressive authentication indicates the method used to improve the computer to authenticate identities that are presented by a user accessing the service, in order to decrease the likelihood of false authentication, and to make the user invest time that is proportional to the value that she will get from being positively identified. The following criteria are incorporated in the method.

The legitimate user should not be requested to invest time in account security that is not proportional to value of the service.

The legitimate owner of an identity knows a lot about the information that is stored by the computer in the account related to the identity; hence, such information can be used by the computer to authenticate the user as the owner of this identity with account questions; this information would be accumulated over time as part of the service to the user, instead of a specific goal to set up security questions (a priori of account creation).

The legitimate user with an authenticated identity, who is using a service and is providing information to the computer that is recorded and associated to the identity, could declare a relative value of such information (at capture, or at any time in the future); the expressed values can be used to calculate a weighted value of the account, and the relative value of each information in it.

The legitimate user may remember a significant proportion of information, though may not remember all details, and some details may be remembered partially, or with variations (such as ways to spell, range of dates, etc.).

The legitimate user may identify with very high success rate facts that did not happen or information that is false, about the services and information if claimed by the computer as being part of the account.

The computer should avoid providing information to the unauthenticated user that is too valuable about the identity, in case the user is not the legitimate owner of such identity; otherwise it may be used and aggregated to authenticate such identity, or anyway steal information and value.

Other factors that can be added in the weighted sum include: the time it takes for the user to respond, the variance of time taken by the user to respond to the questions, the distance of the user provided information from the one found in the user's account, and the variance among different questions.

The computer calculates a likelihood of authenticity, by weighted sum of the account questions and answers to the user about information. The result of the session gets compared to a predefined threshold or threshold range, and the possible outcomes are as follows.

Validated. In this case, the user passed the exam, and is authenticated.

Not validated. In this case, the user did not pass: the likelihood was so low that the probability of abuse is deemed high; measures that can be taken for the next step include increasing the time to take another test, and increasing the threshold for validation.

Needs further testing. In this case, the result was in the threshold range, and the likelihood is deemed close enough that the user should to be given more chance; the next step may be to present another test, but with an increased the threshold range for validation.

There are two methods for the computer to test the user's knowledge of information in the account, related to an ID (account questions):

1. The computer presents a set of facts (some true and some false) and the user select if each is false or true: the computer calculates the correct answers.
2. The user is presented by the computer forms to enter a set of facts that the user claims true: the computer searches in the account, and calculates the correct answers based on finding (or not finding) a match.

The process of how the computer performs progressive authentication of the user is shown in FIG. 9. The user is presented with the identification and authentication screen 0900, explaining to enter the ID that she wants to authenticate to the service in 0901, and to start 0905 the authentication process, or reset the ID 0906.

In the first method, the computer performs searches in the account related to ID 0901 and selects a series of facts (some true because found in the account, some false because made up and not in the account) that can be presented to the user 0910. Such facts may be processed and dissected and information extracted to find details and not providing information to a potentially illegitimate user. The computer presents a list of facts to the user 0911: for each fact in the list the user can choose if it is true 0912 or false 0913. At the end of the list 0914 the user can decide to submit 0915 or reset 0916. The computer can calculate the total number of true statements and verify if the percentage is higher than a predefined threshold range. The facts can be chosen in many ways: the embodiment of FIG. 9 shows facts in the category what, when, who, which could be all filled or partially filled. Also, the number of facts presented in a test can be predetermined, or changed in real time (e.g. add more questions and answers), and be more or less than the embodiment of three facts.

In the second method, the computer asks the user to state true facts about the account 0920, and presents a list of facts 0921 to be entered, and fields 0922 where the user can enter. At the end of the list 0924 the user can decide to submit 0925 or reset 0926. The computer searches for the facts in the account of the presented ID 0901, and determines whether each fact is true or false. The computer can calculate the total number of true statements and verify if the percentage is higher than a predefined threshold or threshold range. The fields for the facts can be chosen in many ways: the embodiment of FIG. 9 shows facts in the category what, when, who, which could be all filled or partially filled. Also, the number of facts presented in a test can be predetermined, or changed in real time, and be more or less than the embodiment of three facts. Last, the assessment of whether a fact is true or false can be done with exact keyword matching, or using other algorithms and metrics of similarity of information.

As a result of submitting a test 0915 or 0925, the user is presented with the result of the test. If the user passed the exam, the computer authenticates ownership of the identity, and the user is signed 0950. If the user did not pass and was below the threshold range, the computer does not validate 0960, then the user is offered the ability to reset 0966, but the user is not presented what a new test of that ID may entail. If the computer calculated that the result falls in the threshold range or within a small range of a threshold (or other problems occurred in the interaction) then it may offer a new test 0970, and so the user has the ability to start it 0975 or to reset 0976.

The computer may perform one or multiple tests of one method, or both methods, or multiple tests, with different number of questions, based on the value of the account at stake. The progressive authentication can be used with any account whether the ID had been previously associated with authentication credentials (e.g. password) or not, including new identification of guests. Considerations for the computer to make assessments of true or false include the following.

Information that had private permission should have the highest weight, public information should have no weight, and information that was permitted should have partial weight: this is to avoid that the user presents available information via other identities.

The more detailed the facts entered by the user, the better; presenting information that only has common terms and prepositions has little value.

In summary, the progressive authentication overcomes the problems of passwords and security questions, and provides the user to authenticate an identity only when needed, and with information that was captured in the normal use of a service, instead of pre-prepared a-priori information set up exclusively for security and account recovery. The progressive authentication consists of looking at the authentication not as non-binary fashion (yes or no), but as a likelihood function: the more the user proves to know, the more the computer can decide what to enable versus not. Vice versa, in order to authenticate the a user that has very little in the account, or of little value, then little has to be proven to know: when a user shows an identity, her level of authentication is based on the actions that she wants to be authorized to do. The authentication can be done progressively, by requiring less to do certain things, and asking more to do others or more. Also, the account questions are not pre-defined security questions that would make friction, but about information that is built uniquely by the user in the system with that ID. The progressive authentication is proportional to the value of the resources associated to the identity.

Transparent Capture and Immutable Webification with Immediate Findability

The transparent capture and immutable webification with immediate findability is a further explanation of the capture and immutable identification incorporated by reference of U.S. patent application Ser. No. 13/615,340. Here is explained with a computer embodiment of a mobile phone.

When a photo is captured as usual by the computer or phone, and without user intervention ("transparent") the photo is "webified" with a persistent identifier ("immutably") and metadata (including who-what-when-for whom). The photo is recorded in the meta-base, so that it gets immediately searchable, thus findable by requests of permitted IDs (in the example here described it is findable by everyone because the permission default had been set as public).

Figure 10:
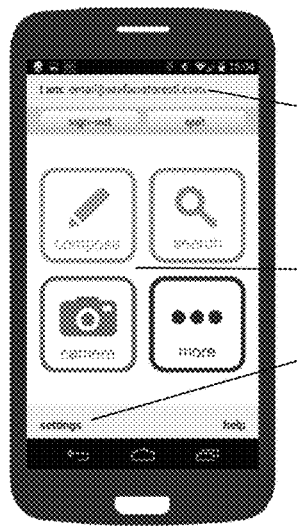
FIG. 10 shows the mobile home with the identification of a first user.
Figure 11:
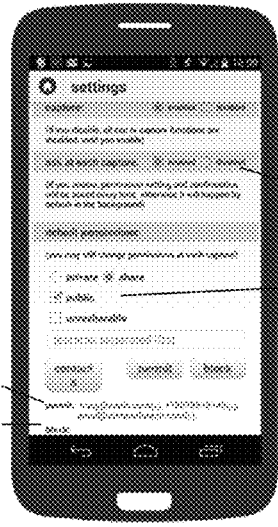
FIG. 11 shows the settings screen including defaults.

The process with two computers (smart phones, one capturing, one searching) used by two users is shown in FIGS. 10-15. FIG. 10 shows the app's mobile home with the identification (ID) of a first user. The user is authenticated with an ID 1001 such as a phone number, an email address, or any unique ID issued by the government or other identification services. The button 1005 can be tapped to get to the settings screen to change default permissions, as well as other settings for the session, or for the all actions until another change of settings. The settings screen is shown in in FIG. 11, where the relevant settings for this embodiment and example are:

the selector 1110 to enable or disable asking options after each capture and webification: by disabling it, no user intervention or click will be asked by the computer after a transparent webification, (other than the action the user would do to select or capture or save); hence, the default permissions is used.

the default permission, which is selected in this embodiment as public 1105; 1101 shows the list of permitted IDs, and 1102 shows the list of blocked IDs (in this example, the list is empty, because public 1105 is selected.

Figure 12:
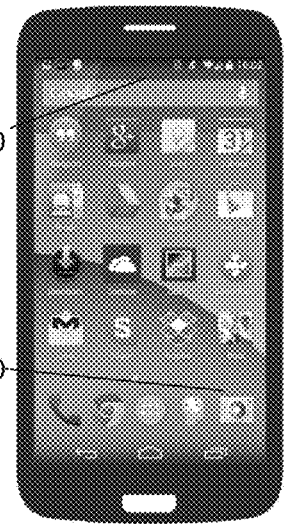
FIG. 12 shows a smart phone home screen with several apps icons including a camera app.
Figure 13:
FIG. 13 shows the camera app and a picture that gets a unique identifier and URI upon capture.

With the settings of this example, i.e. public permission, the captures are findable by everyone. FIG. 12 shows the smart phone home screen 1200 with several apps icons, including the camera app icon 1250, which, if it gets selected by tapping (or clicking), it opens the camera app of the smart phone or computer. FIG. 13 is the camera app 1300 with the

Figure 14:
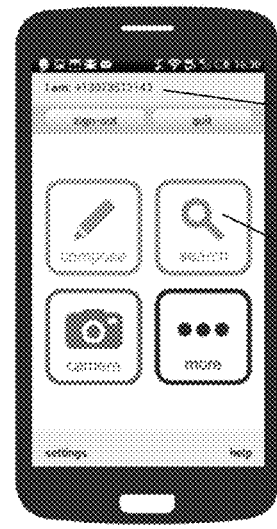
FIG. 14 shows a user with another device and identified with another ID in the mobile app home.
Figure 15:
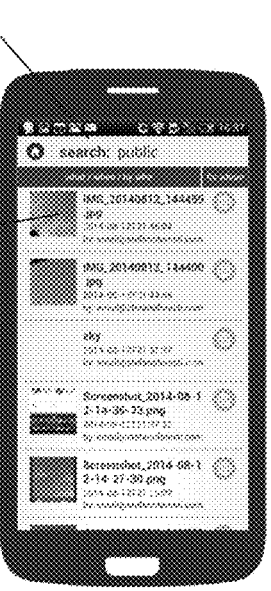
FIG. 15 shows search results by a second user, containing the just captured photo by the first user.

1302 button that gets tapped to take the photo. When the photo is taken, it is "transparently" and "immutably" webified: a unique identifier and a URI using such identifier 1301 are generated by the computer or smart phone, and the metadata and the capture related to 1301 are immediately searchable. The URI 1301 generated on the device is immediately available for use even if the synchronization of the data and metadata with other computers has not occurred yet. All this enables to immediately hyperlink and use such capture via its URI in other content generation and capture, as incorporated by reference of U.S. patent application Ser. No. 13/615,340. Meanwhile, a user with another device and identified with an ID 1401 in FIG. 14 is searching for content and taps search 1450: the photo just captured by used ID 1001 and immutably webified 1301 is findable by such ID 1401 because, it was permitted to her (being public—in this example). The smart phone or computer returns the list 1500 of public search results in FIG. 15, which contains the result 1501 which is the captured photo 1301 by the first user 1001. It is displayed in this example with some of its what-when-who metadata 1501.

The capture and immutable webification applies to any media type, in any media format, in any device or storage where it is or was recorded. An image may be generated as a photo, picture screenshot, scan, or any image editing method. Videos, video clips, audio notes, audio clips, or any other form of media capture and media files are included. The computer can capture given a single user action or click, or any other user intention to capture, depending on the available selection methods offered at that time by the device and operating system user interfaces, including: gestures, eye tracking, hardware buttons in devices, software buttons in displays, haptic displays, audio display, graphic display. A capture can also be triggered by user predefined selections, automated selections, or auto saves. The unique identifier (XID) that is generated in the device of capture, can be used to form a URL (which can be used immediately, e.g. to link it in other content). It can also be used as a fingerprint of such capture, to verify authenticity and integrity. The metadata is immediately searchable in the meta-base by who, what or when.

The implication of immutable webification is immediate searchability of captured information. Here is a comparison of this invention with the status quo. A "capture" is a piece of info that can be selected. It is registered along with the ID of who captured, and the UTC time of capture (who-what-when). Such capture is considered an immutable object, and is associated to a unique identifier that is generated in the device of capture, and can be used:

to form a URL, that can be used immediately, e.g. to link it in other content.

as a fingerprint of this capture, to verify authenticity (is it exactly as it was captured?).

the metadata is immediately searchable in the xap.io meta-base by who, what or when.

Status Quo.

There is no systematic way to determine who created what information and when. For example, a file is generated on a user's computer, and initially stored in the local drive; later, this file gets attached to an email, or uploaded in some cloud storage, or synced to other computers, or downloaded by others, etc. There is no way to verify the provenance of such a file, who did it, and when. Identification and watermarking methods are applied to specific platforms or data types, and if so, they are not easy for the user. From the search standpoint, such file is only searchable in the environments where the file resides.

Invention.

Every capture (user selected information) is registered with a unique ID, and becomes immediately searchable upon its birth by who, what and when. Who captured is the legitimate owner. The capture can be immediately hyperlinked in other content. If such capture is requested or otherwise pulled, the owner can track. If such capture is found in a device that runs this software, it is possible to verify its fingerprint. The computer, as a result, offers people to validate ownership and use of their information. Rewards can be built on top of the foundation of requests (pull).

Metadata of a Capture with Immutable Webification

Figure 16:
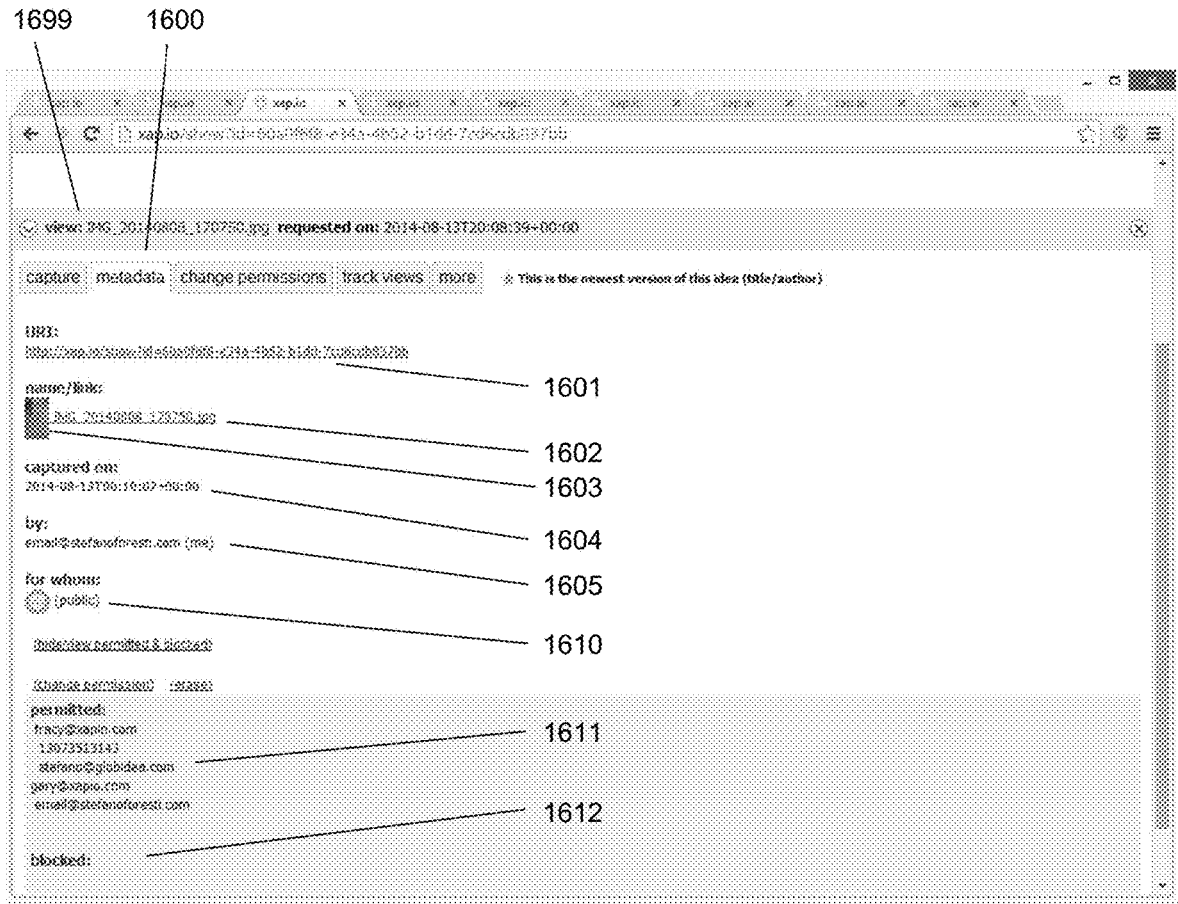
FIG. 16 shows meta-data of a capture.

The metadata of captures is incorporated by reference of U.S. patent application Ser. No. 13/615,340. FIG. 16 shows more details of an embodiment of the meta-data. Given a capture in view 1699, the metadata 1600 tab shows metadata that can be requested by the meta-base about this capture.

1601 The URI is generated using or hashing the global unique persistent identifier of the capture.

1602 The name of the capture may or may have not been selected; similarly a thumbnail or icon may be or may not be available 1603.

1604 The time stamp of the capture in UTC time format.

1605 The author/owner (by whom) is the authenticated ID of the entity who captured.

1610 The overall permission type (private, shared, permitted, unresharable, public).

1611 The list of permitted IDs to find or access such capture.

1612 The list of blocked IDs to find or access such capture.

Tracking

Figure 17:
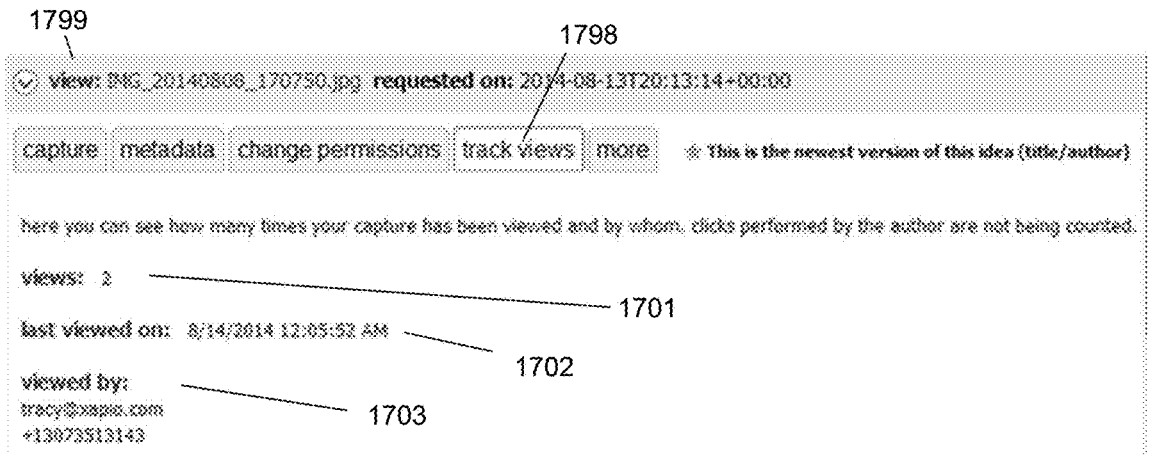
FIG. 17 shows the tracking information related to a capture.

A capture with global unique identifier 1601 can be accessed via a "pull" request (whether as a result of a search, or hyperlinked in other information). As a result, the pulls or requests of a capture are recorded; hence tracking information is available in the meta-base. Information that is accessible by the owner of the capture include the ID and time of a request (in addition to other web server metadata). For example, the screenshot in FIG. 17 shows a view 1799 of a capture, with a selected tab 1798 to view tracking information. This example includes:

the total number of requests 1701

The UTC time of the last request 1702

The list of unique IDs that have requested 1703

The meta-base can be searched to provide details of requests, or a complete log of requests, including who (ID) requested what (which XID) when (at which UTC time).

Related Information

The meta-base and the user interfaces in this invention support finding related information. Given a capture (also called information object, or object) the meta-base knows the list of objects that are related based on various types of relationship. This includes:

linked: connected in the directed graph via hyperlinks;

age related: captured in the same selected time range, or of similar age;

similar in content: semantically similar in content, or versions as defined by the authors.

Linked objects. Given an object, the meta-base knows the list of hyperlinked objects. More specifically, the options are:

Incoming links, or "linked to" or "parents of" the current object: this is the list of objects that are hyperlinked in the content of the said object;

Outgoing links, or "linked from" or "children of" the current object: this is the list of objects in whose content there is a hyperlink to said object;

Co-linked, or "linked with" or "siblings of" the current object: this is the list of objects that are hyperlinked together with said object in the content of yet another object.

These types of related objects represent the adjacent nodes in the directed graph of the objects and their hyperlinks (or connections captured based on human knowledge). The link-based object relationships can be extended to higher degree of hyperlinking, (for parents, children and siblings). Using second degree linking as an example, two objects are linked (to or from) as a second degree if they are distant by one vertex in the directed graph.

Similar Objects.

Another type of relation among objects is whether they are similar, where similarity can be defined in various ways, or metrics. The options include:

similar content, based on semantic algorithms that establish that the content is similar, or by the assessment of people, versioning: the authors could define that one object is a new version of an existing object.

This can be done in various ways including: by creating the new capture as a "new version" of an existing capture, in which case the meta-base flags that they are versions, or by "naming" two objects with the same name: in which case the newly created object is a new version of the existing one.

Age Related.

Given a time range, two objects are of similar age if:

their immutable timestamps are in the said time range; or their original capture age, as assessed and corrected after the fact, is in the same time range.

Figure 18:
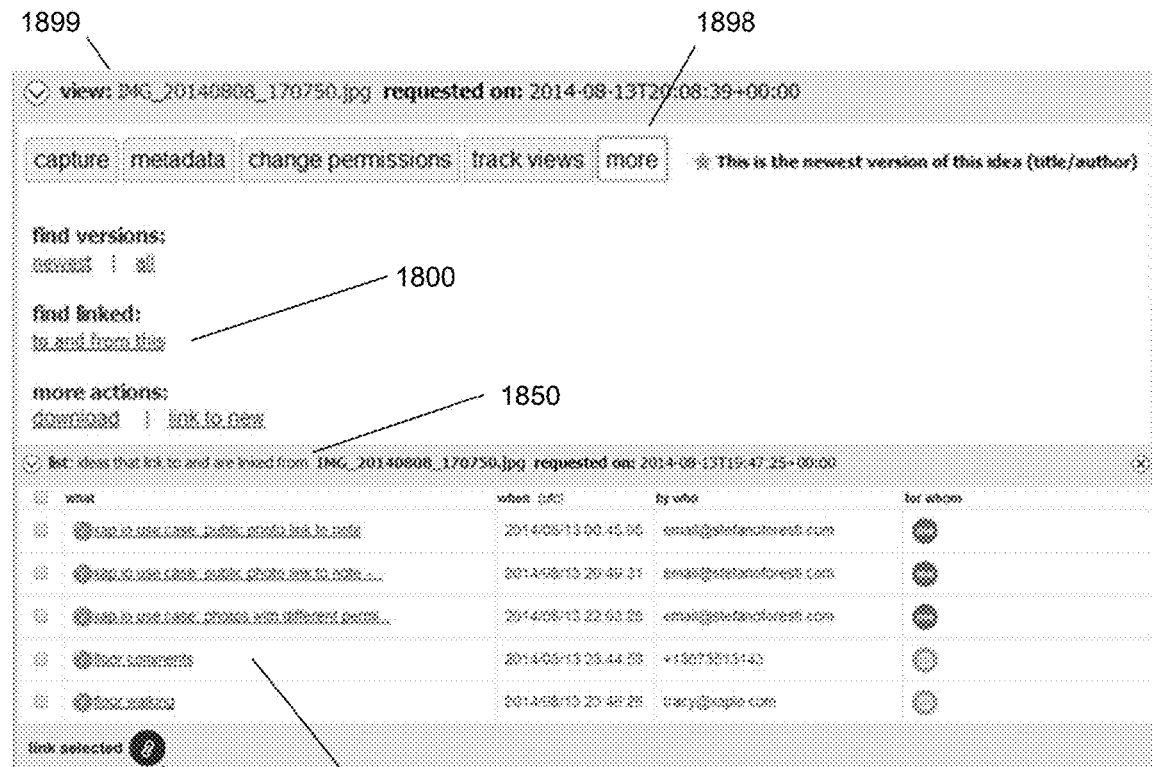
FIG. 18 shows a linked capture.
Figure 19:
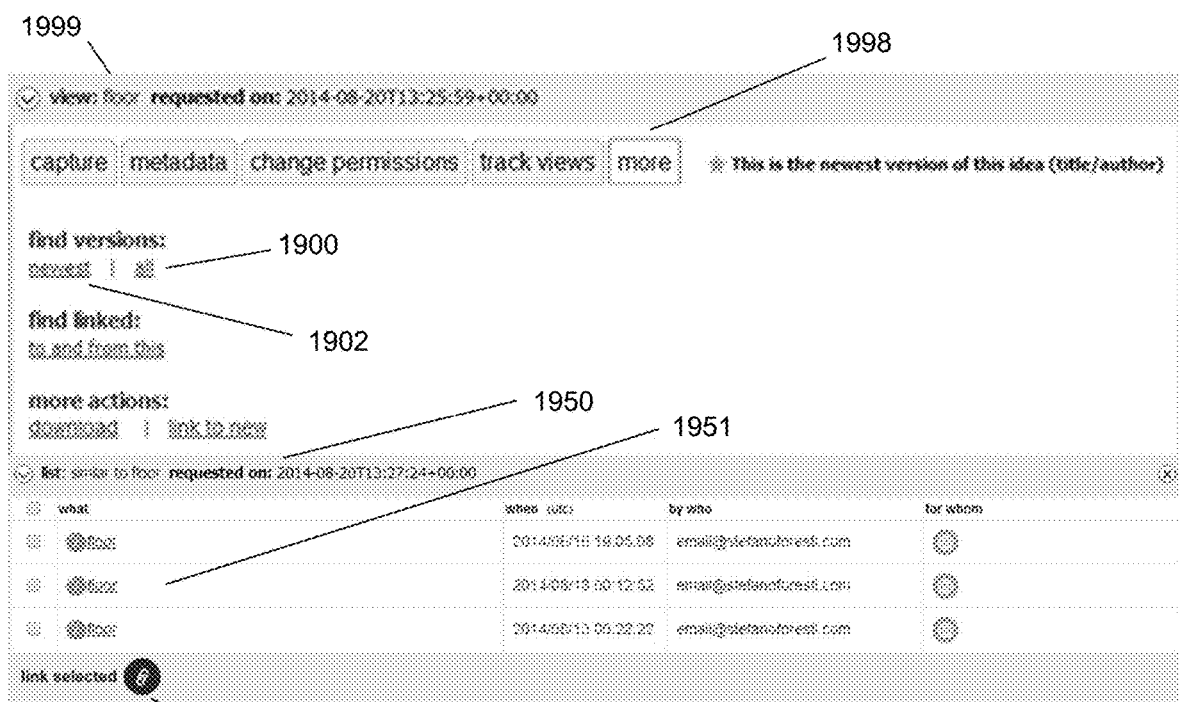
FIG. 19 shows a similar capture.

Examples of related objects are shown in FIGS. 18 and 19. Given a capture in view 1899, FIG. 18 shows an example of the information in the meta-base related to the capture: the linked captures 1800. This is accessible in the example by accessing the tab more 1898 and selecting "linked to and from this" 1800. This triggers a search, and the list of results are displayed in a view 1850: the items are 1851, which can be acted upon (other than viewing) by selecting and linking into other information, such as the link selected 1852. Given a capture in view 1999, FIG. 19 shows an example of the information in the meta-base related to the capture: the similar captures 1900. In this embodiment, the similarity is defined as the versions of the captures with the same name; however other similarity metrics between information captures can be used by the computer to find similar captures: this includes similar content, same words used, similar topic, and similarity in photos or videos based on different views or focus of similar scenes, or other methods in computer vision, or determination by users. This is accessible in the example by accessing the tab more 1998 and selecting "find versions: all" 1900. This triggers a search, and the list of results are displayed in a view 1950: the items are 1951 are the results of a similarity search, 1, which can be acted upon including viewing, or selecting and linking into other information, such as the link selected 1852 and 1952

Connect and Link Selected Pieces of Info Across Apps

Connecting disparate bits and pieces of information like ideas, so that they are immediately "webified" and linked is incorporated by reference of U.S. patent application Ser. No. 13/615,340. The computer can connect or hyperlink multiple pieces of information or captures:

passively: the computer interprets user selections and actions as connections;

actively: the user explicitly expresses which selections are connected;

automatically: the computer connects without user intervention, based on previously defined rules.

Figure 20:
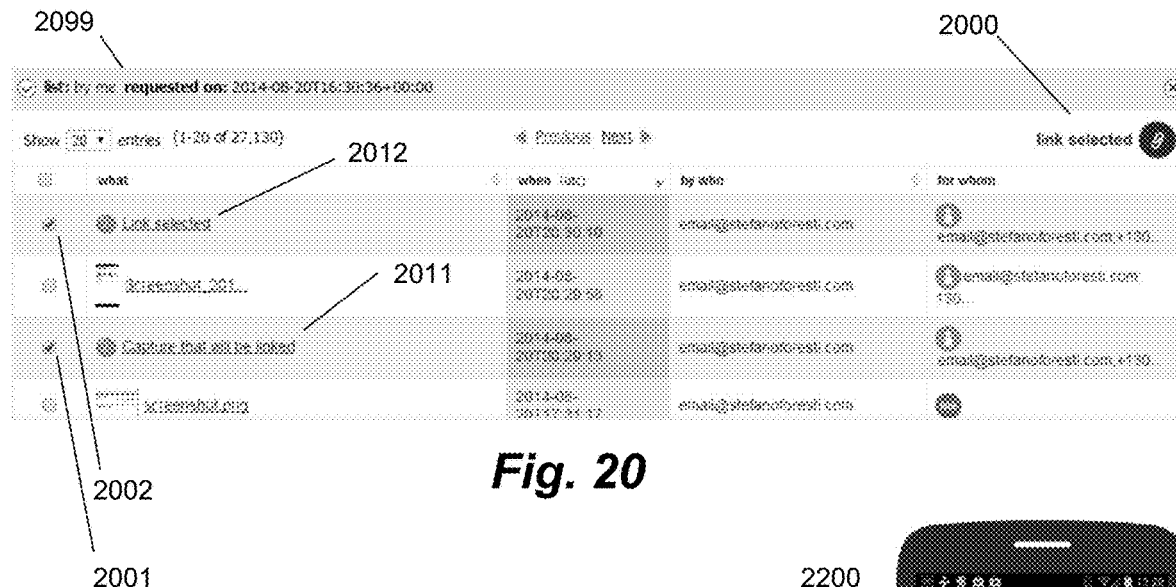
FIG. 20 shows a list of items, selecting some of them, and linking them.
Figure 22:
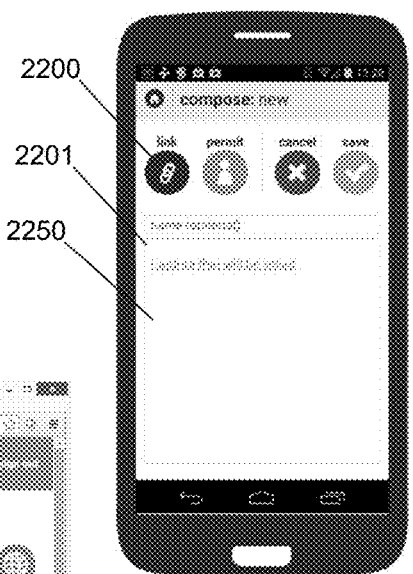
FIG. 22 shows hyperlinking selected items in the editor of a smart phone.
Figure 21:
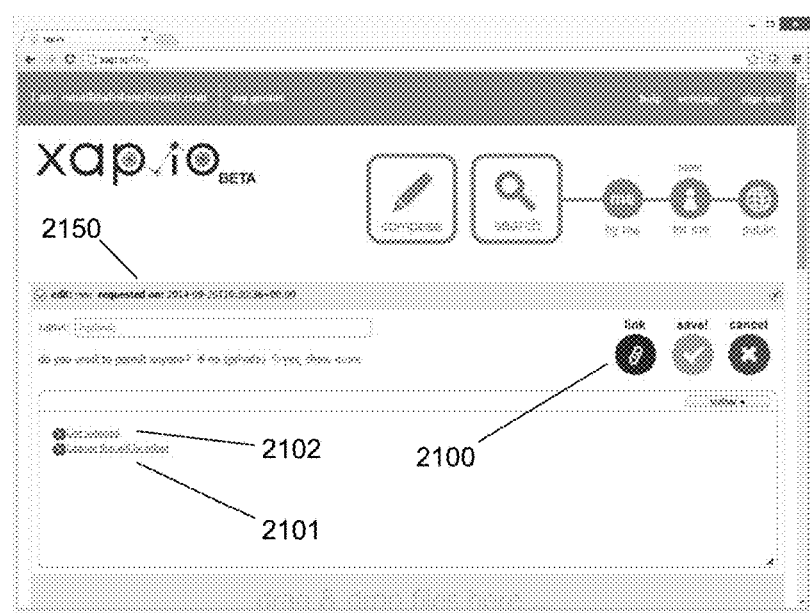
FIG. 21 shows hyperlinking selected items in the editor in the web interface.

Here is explained with computer embodiments of a mobile phone and a web browser. FIG. 20 shows a list of items in a view 2099, and two specific items 2012 and 2011 which are selected respectively with 2002 and 2001. By selecting link selected 2000 those items are linked in the meta-base; also, in the example of FIG. 21, the same user with a web user interface is using the editor 2150 and while composing selects to link 2100, which adds hyperlinks to items 2102 (equal to 2112) and 2101 (equal to 2111) in the editor. Likewise, FIG. 22 shows linking selected items in a smart phone environment: the user composes 2250, and taps link 2200, which adds a hyperlink 2201 to the latest capture that was selected by the user in the mobile session.

Link selected stands for the method and user interface to select existing items in the results of a search, and to hyperlink them into a new capture being created. Possible ways include:

select items in a list or multiple lists or search results, or a view, and to click "link" or "link selected" in a new idea being created.

select items in a list or multiple lists of results and click "link" or "link selected" in the list.

An editor may be spawned to compose a new capture which contains the links to such items; the user can then save or continue editing or adding links. Saving a list of selected links can lead to an "explained saved search" of immutable objects, and this explained saved search is a capture itself. Notice that the items in a linked selected turn out to be "siblings", a denomination to indicate items that are linked together in another capture.

Figure 23:
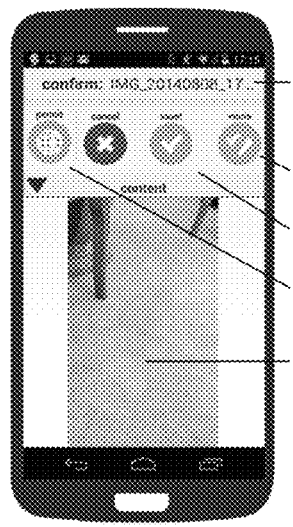
FIG. 23 shows a confirmation screen of a photo including the option to link it to a note.
Figure 24:
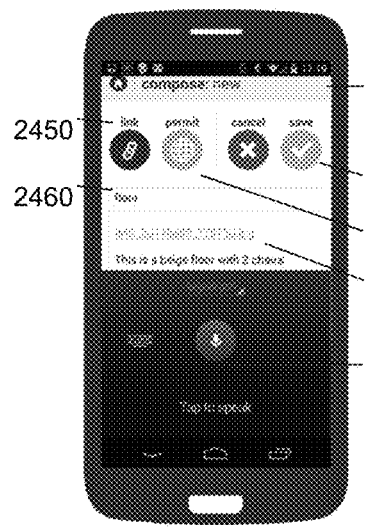
FIG. 24 shows an editor composing a note that already contains a hyperlink from previous capture.
Figure 25:
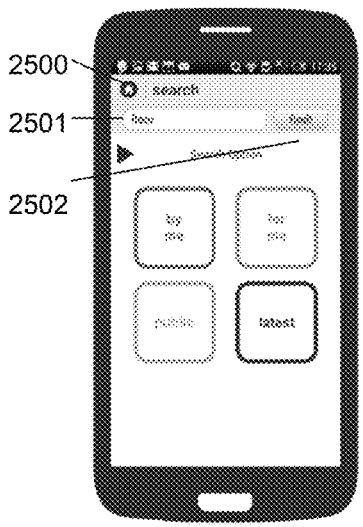
FIG. 25 shows a keyword search in the mobile by a second user.
Figure 26:
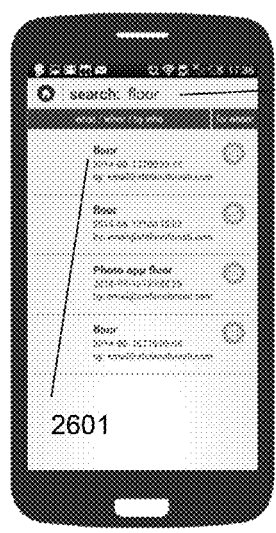
FIG. 26 shows the results of a keyword search in the mobile, including a note just taken by the first user, and containing the keyword.
Figure 27:
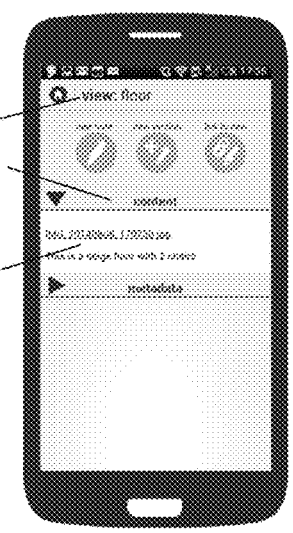
FIG. 27 shows the view by the second user of the note by the first user, including the hyperlink to the photo that was taken by the first user and linked to the note.
Figure 28:
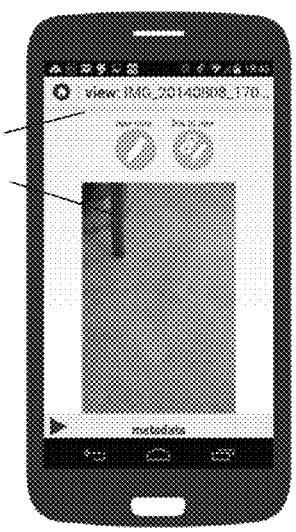
FIG. 28 shows the view by the second user of the photo after having clicked the hyperlink in the note by the first user.
Figure 29:
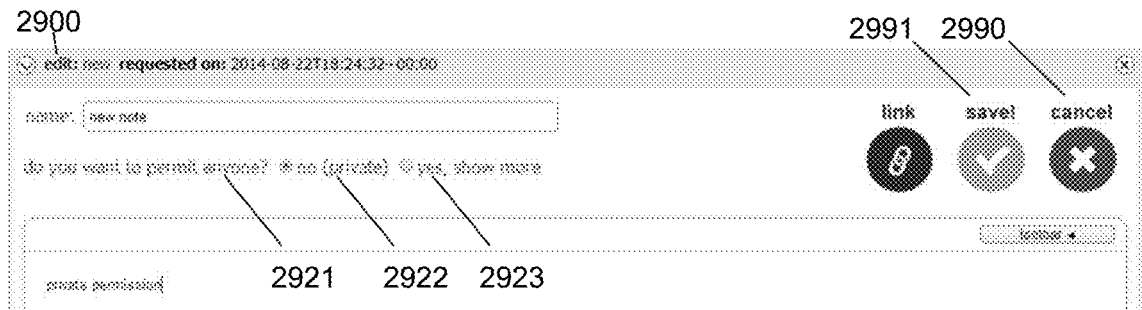
FIG. 29 shows the progressive permission starting from private, while editing a note.

An example of linking information so that is found by others via the hyperlinks in a mobile environment is shown in FIGS. 23-28. A first user, as in FIG. 10 with ID 1001, has selected in the settings of FIG. 11 to enable 1110 asking at each capture, starts the camera app 1250 in FIG. 12, and takes a photo similarly to FIG. 13. FIG. 23 shows a confirmation screen 2300 that is popped up right after taking a photo 2301, including the option to change permission 2310, just save 2320, or save with link into a note 2330. The user selects 2330, and the screen in FIG. 24 is shown, with an editor to compose a note 2400, which already contains a link 2410; the user can edit with a keyboard or, as in this example, with voice to text 2401. The user can change permission 2420, link other selections 2450, and save 2430. Notice that the note contains the word "floor" 2460 in this example. Meanwhile, a second user with another device and identified with an ID 1401 in FIG. 14 is searching for content and selects a keyword search 2500 in FIG. 25, types "floor" in the keyword search 2510, selects to find 2502. The smart phone or computer returns a search results screen 2600 in FIG. 26 with a list of results that contain "floor" 2650: among them, there is a result 2601 which is the note just captured 2430 by the first user 1001. A viewer 2700 opens in FIG. 27 showing the note and its content 2701, which contains the hyperlink 2710 to the photo 2301 that was taken by the first user and linked to the note. The hyperlink 2710 leads to the viewer 2800 of the photo 2801 (same as 2301) in FIG. 28.

Dynamic Versus Static Objects

The computer captures information objects and assigns a persistent unique global identifier (XID) to the immutable object. If the object is changed, a new version is saved with a new XID. Therefore, if a user requests an object with an XID, the content will be the same in the future as in the past. At search and view time a user may want, or expect, to see an up to date version of an existing capture. In general there are two options for what the users expect: static and dynamic. I call the static view (or Eulerian view) the view of the fixed observer, and the dynamic view (or Lagrangian view) the one of the dynamic observer, and more specifically:

"static": view the object exactly as it was seen before: e.g. I want to see a picture, or doc, or web page exactly as it was.

"dynamic": view the current state of a dynamic object: e.g. view the most recent home page, or the headline news of a newspaper.

Because the computer needs to satisfy both potential needs, it can offer static and dynamic searches, and potentially addresses:

static search: it is the lookup for an XID.

dynamic search: it is a search for the newest version (e.g. as explained in related objects) of the object with the XID of interest, where the newest version is based on the versions as defined in the "similar objects", and newest means the latest time stamp available in the meta-base among the various versions of an object.

Meta-Editor

The meta editor captures the user's text input, any time the user is entering text. This can happen in many ways, including with a physical keyboard, with a virtual keyboard, or on the screen, with text recognized from voice input, or with text captured from user input in other ways. The text can be captured in many ways, including:

a text editor, or a word processor, entering text in fields of web forms or any computer application, entering text in apps, entering text in fields wherever the OS or application software allows, while trying to enter text on displays that would otherwise not accept a user text input (e.g. the desktop background, or other parts of the screen in apps that are not meant to accept text.

For example, I describe the following scenarios.

Typing text in the editor of an application. In this case, the text input in that editor is captured upon save of the application. For instance, editing in MS Word, entering text in a new or existing document will result (upon save of the MS Word file) in a capture of the new text input by user, the whole text of the document, or both. The user may have a choice, e.g. via a popup, to choose one option, or the other, or both.

Typing text on the desktop, or a part of the screen where the OS is not expecting and would not otherwise accept text input. This invention improves the computer by enabling to capture the text in any situation the user is typing text, or wants to enter text, and also offering the option to save the input into a capture.

A special device note taker that facilitates capture and link selected items into the text.

In summary, the meta editor works as a "transparent" or "overlaying" editor that captures the text that is entered in relation to the display: when the user inputs text, such text is captured, and the meta editor may offer the option to save. The meta-editor is more valuable than simply logging key strokes, because it may record text that otherwise would not have been accepted, and it is not a stream of characters, but user defined capture.

Progressive Permission

The computer register an object level access control with user interfaces that enable the user to select who can, and more importantly, who must not, find such capture. In this permission system the user could express for each capture who is permitted (if any) to find who is blocked (if any) to find The system view of the permission is to determine, upon search or request, if an identity is permitted or not to access an object. The model of this invention is to make all content immediately searchable: because a capture is immediately assigned an XID, and the metadata (including who capture, when it was captured, and who/what is permitted to find) is immediately generated and available in the meta-base, then such capture is immediately searchable, and findable by who was permitted, and not by who was blocked.

The computer provides the user with options to permit and block lists of IDs to find and access a capture (XID). The option includes private (no one, only the author/owner) or public (every ID, no one excluded). The model is applicable both to information being captured, or already existing captures (change of permission). The computer allows a user to express the permission intention of selected information associated to the user's identity in a progressive and interactive manner. This includes building a final permission as a step by step approach, adding or subtracting IDs (information, or users, or identities) to and from a list that will be the final intended permitted (or white) list of IDs; likewise, building a final list of blocked IDs by adding or subtracting IDs (information, or users, or identities) to from a list that will be the final intended blocked (or black) list of IDs. The result is that such information object or capture is findable and accessible by the IDs in the permitted list, but not the ones in the blocked list. The method also includes the options whereby that information cannot be found and accessed by anyone except the user having authenticated that identity, or the option whereby it can be found or accessed by everyone and everything in the world without authenticating an identity.

Figure 30:
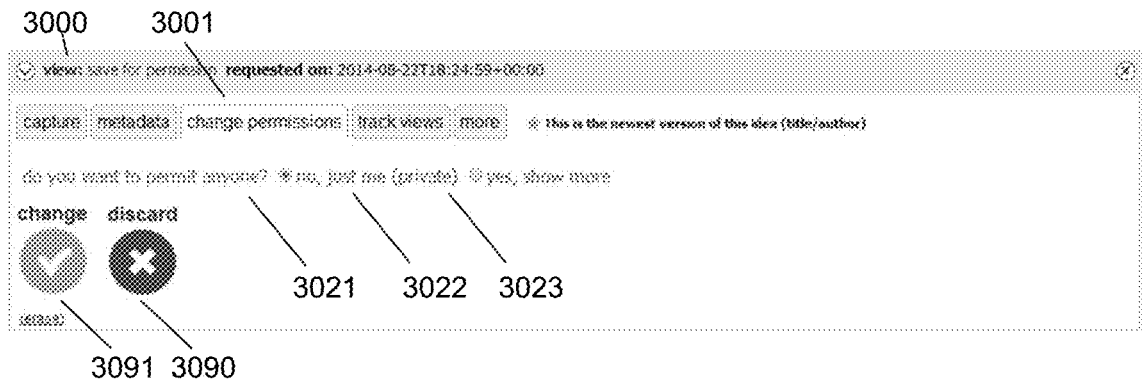
FIG. 30 shows the progressive permission starting from private, changing the permission of a note.
Figure 31:
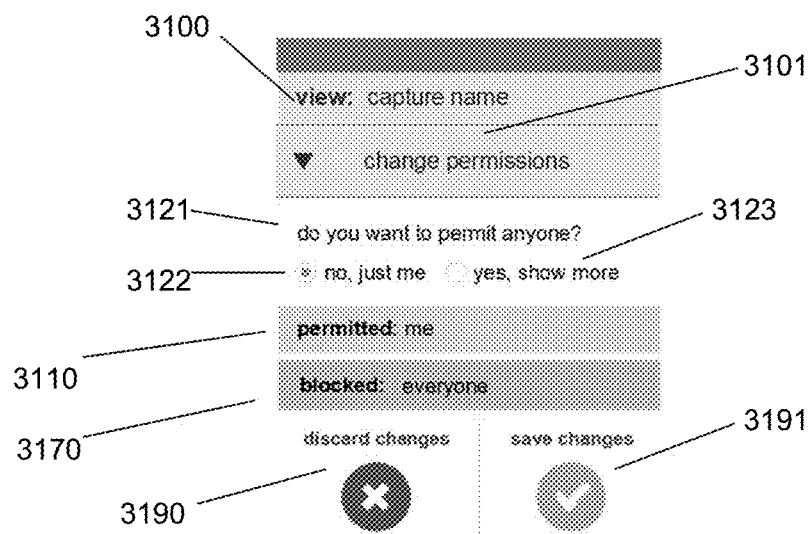
FIG. 31 shows the progressive permission starting from private, changing the permission in mobile.
Figure 32:
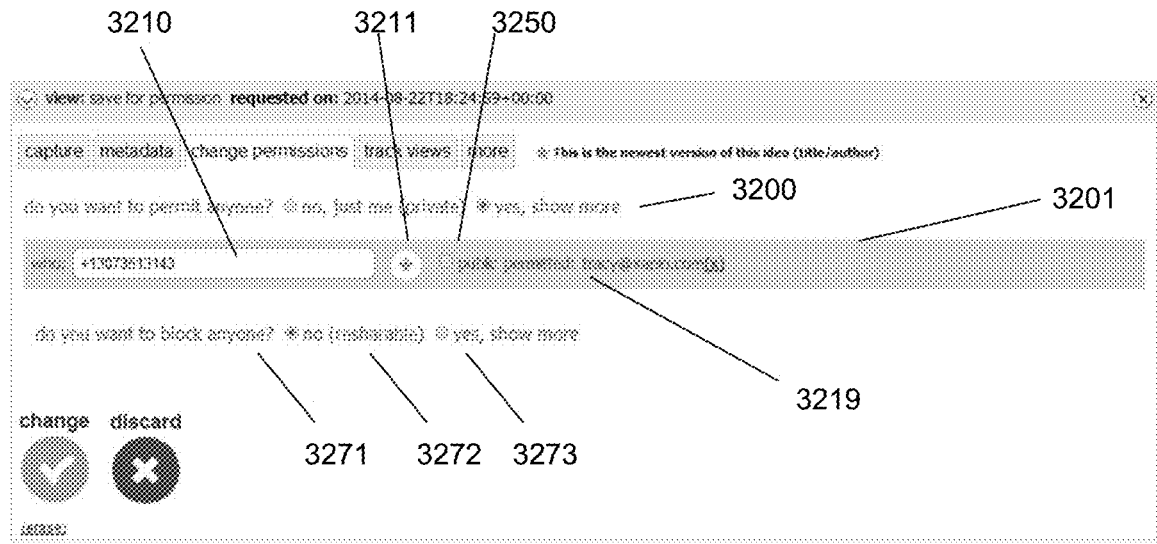
FIG. 32 shows the progressive method to add permissions in the browser.
Figure 33:
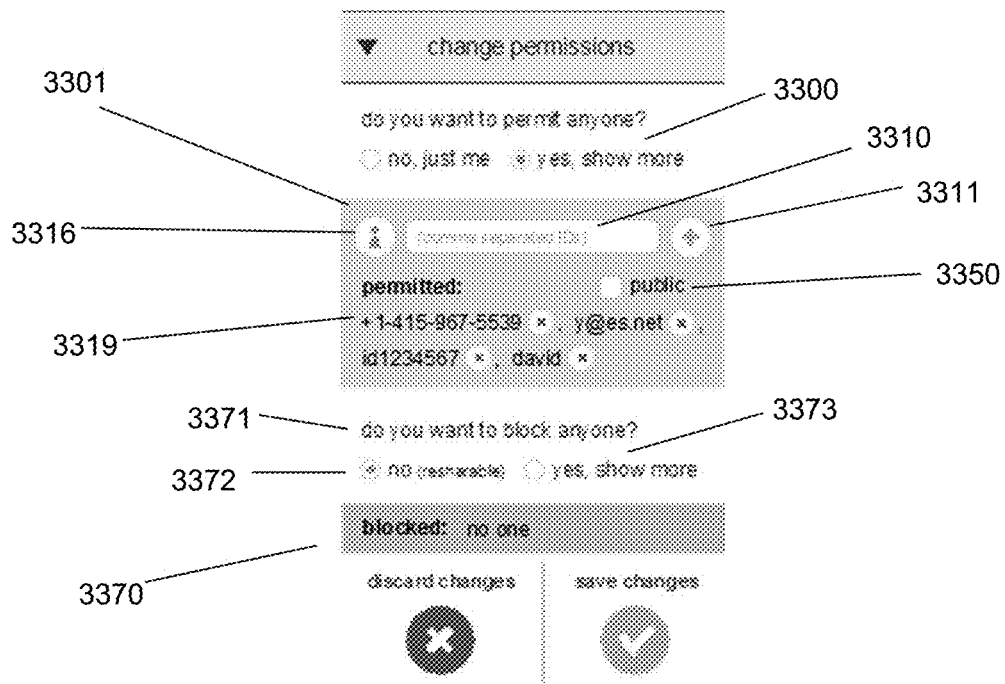
FIG. 33 shows the progressive method to add permissions in the mobile.
Figure 34:
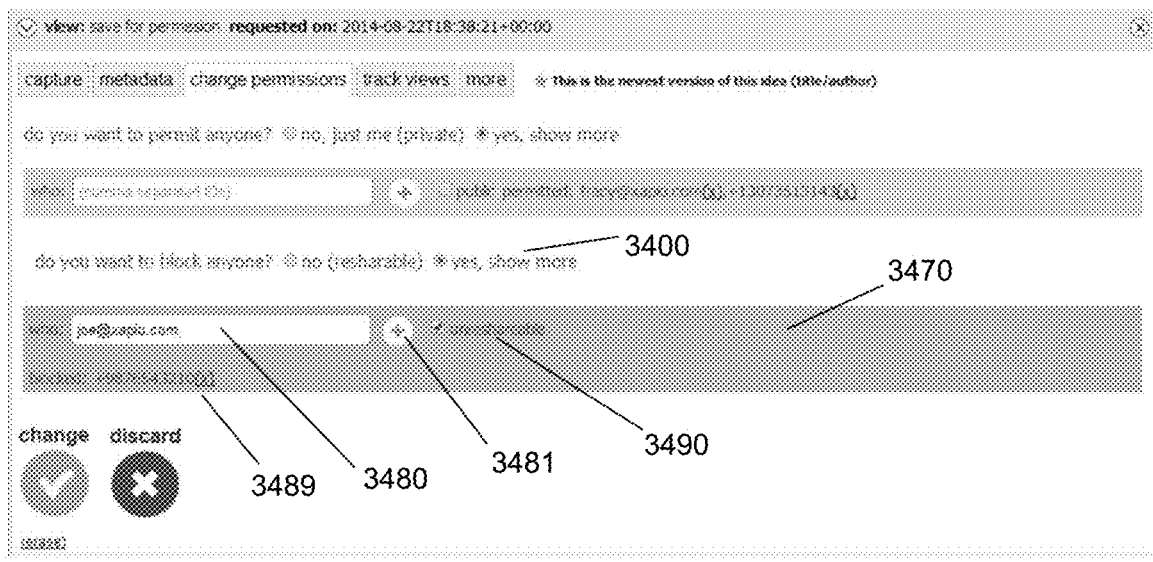
FIG. 34 shows the progressive method to block permissions in the browser.

FIG. 30 shows the permission while editing a note 3000, while FIG. 31 shows the change of permission 3101 of an existing capture 3100; FIG. 32 shows the change of permission 3201 in a mobile user interface 3200. FIGS. 30-36 show the progressive permission building that the computer offers to the user. It starts asking whether the intention is to keep the capture private, or permit anyone else 3021 or 3121 or 3221. If the user selects no (private) 3022 or 3122 or 3222 the permission user interface does not change, and the capture will be private. The permission is finalized at the time of capture 3091 for the new capture (or canceled 3090 in case the capture is discarded); when the permission is changed, it is finalized upon selecting change 3191 3291 (or changes in the making can be discarded 3190 or 3290). FIG. 32 also shows the summary of who is permitted 3210 (me only because private) and blocked 3270 (everyone). In case the user selects to permit anyone else, the permission user interface is changed by the computer to open a new set of options for permission and potentially blocking, which are shown in the following figures. If the user selects to permit 3023 or 3123 or 3223 the screens are shown in FIGS. 33 and 34, respectively for web user interface and mobile user interface (only change of permission from this point on to avoid repetition). The user selected to permit 3300 3400 and the permit panel 3301 3401 has more options, including entering IDs 3310 3410 (with the ability to also select from contact manager 3416) and an option to add 3311 3411 such entered IDs to the final permitted list 3319 3419. The option to select public 3350 3450 would make every ID permitted.

Figure 35:
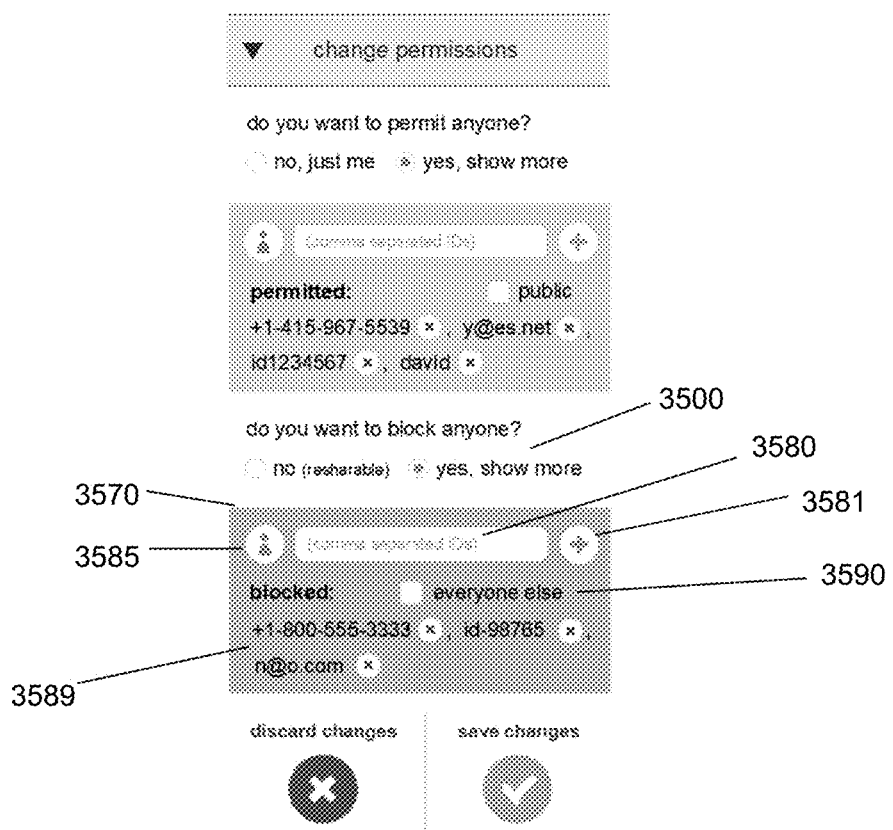
FIG. 35 shows the progressive method to block permissions in the mobile.

The computer then presents to the user the option to express whether to block anyone 3371 3471. If the user selects 3372 3472 no one is blocked and the capture is resharable (or just sharable): in the screen of FIGS. 33 and 34 "no" is selected 3372 3472, so that the blocked list in the summary 3470 shows no one (blocked). If the user selects to block 3373 or 3473 the change in the user interface are shown in FIGS. 35 and 36, respectively for web user interface and mobile user interface. If the user had selected to block 3500 3600, then the block panel 3570 3670 opens with more options, including to enter IDs 3580 3680 (with the ability to also select from contact manager 3685) and an option to add 3581 3681 such entered IDs to the final blocked list 3589 3689. The option to select unresharable (as in the web user interface 3590) is equivalent to blocking everyone else (as in the mobile interface 3690). If the user had specified blocking in 3500 or 3600, the object is unresharable 3590 3690 even if no IDs are added to the blocked list 3589 3689.

In summary, the computer enables to progressively build a white and black list (permit and block), in a frictionless manner, because the user is asked progressively whether to permit and block, and not forced to complete specific permit or block lists; however, the user can go into details if she wants. Once the permission of a capture is saved, other users will be able to find and access such capture if the ID they authenticated is in the permit list and not in the block list. Setting permissions can be done:
  based on default permission settings, or
  before saving a capture being edited, or
  at the moment after a capture is saved, or
  changing permission of an existing capture at any time in the future.

Permission Inheritance of Linked Objects

Permission inheritance indicates a method for the computer to determine and eventually change the permission of existing captures (objects) that are connected or linked in a new capture. Given a capture O_old and a capture O_new, where the user links O_old, the permission inheritance enables the computer to change the permission of O_old based on the permission that the user selects for O_new.

In the following method, the word restricted is intended as equivalent to unresharable. The word author is used to indicate the user who is capturing and has authenticated in the service with a certain PID. The word OR and AND are used to indicate respectively addition or intersection of the elements of a group of objects (in this case objects or PIDs or XIDs). The terms author(O_new) means author of O_new, i.e. the new object: this is the way to interpret the terms in the method. If an object O_old gets hyperlinked in a new object O_new (via link selected, or drag&drop, or whatever other possible method) the permission of O_old is changed upon successful save of O_new in one of the following ways:
  if author(O_new) is equal to author(O_old), then permission(O_old) is changed to permission(O_old) OR permission(O_new)
  if author(O_new) is different from author(O_old) AND permission(O_old) is not restricted, then permission (O_old) is changed to permission(O_old) OR permission(O_new)
  if author(O_new) is different from author(O_old) AND permission(O_old) is restricted, then permission (O_old), then permission(O_old) remains unchanged This is one possible algorithm to determine and eventually change the permission of existing captures (children objects) that are hyperlinked to an existing capture (parent) where the permission is changed. If an object O_child is hyperlinked in another object O_parent the permission of O_child is changed upon successful change of permission of O_parent in one of the following ways:
  if author(O_parent) is equal to author(O_child), then permission(O_child) is changed to permission (O_child) OR permission(O_parent)
  if author(O_parent) is different from author(O_child) AND permission(O_child) is not restricted, then permission(O_child) is changed to permission(O_child) OR permission(O_parent)
  if author(O_parent) is different from author(O_child) AND permission(O_child) is restricted, then permission(O_child), then permission(O_child) remains unchanged There are multiple possible rules and choices to implement a permission inheritance algorithm: this is one possible embodiment to determine and eventually change the permission of existing captures (children objects) that are hyperlinked to an existing capture (parent) where the permission is changed.

Other Embodiments

Other digital computer system configurations can also be employed to perform the method of our techniques, and to the extent that a particular system configuration is capable of performing the method of our techniques, it is equivalent to the digital computer system described here, and within the scope and spirit of our techniques.

Once they are programmed to perform particular functions pursuant to instructions from program software that implements the method of our techniques, such digital computer systems in effect become special-purpose computers particular to the method of our techniques. The techniques necessary for this are well-known to those skilled in the art of computer systems.

Computer programs for creating the special-purpose computer supporting the method of our techniques will commonly be distributed to users on a non-transitory distribution medium such as floppy disk or CD-ROM. From there, they will often be copied to a hard disk, flash memory, or a similar intermediate storage medium. When the programs are to be run, they will be loaded either from their distribution medium or their intermediate storage medium into the execution memory of the computer, configuring the computer to support the method of our techniques. All these operations are well-known to those skilled in the art of computer systems.

The term "non-transitory computer-readable medium" encompasses non-transitory distribution media, intermediate storage media, execution memory of a computer, and any other non-transitory medium or device capable of storing for later reading by a computer a computer program implementing the method of our techniques.

It is to be understood that the above described embodiments are merely illustrative of numerous and varied other embodiments which may constitute applications of the principles of our techniques. Such other embodiments may be readily devised by those skilled in the art without departing from the spirit or scope of our techniques and it is our intent they be deemed within the scope of our invention.

I claim:

1. A method for making content globally findable in a global information network, comprising:
  (a) selecting a first content in a client computer not currently connected to the global information network; and then (b) capturing an identity of an authenticated user who selected the first content; and then
(c) generating in the client computer not currently connected to the global information network a first globally unique persistent identifier corresponding to the first content; and then
(d) generating in the client computer not currently connected to the global information network a first URL corresponding to the first globally unique persistent identifier; and then
(e) selecting a second content in the client computer not currently connected to the global information network whereby the selection of the second content is performed by the authenticated user who selected the first content; and then
(f) in response to the selection of the first content modifying the second content in the client computer not currently connected to the global information network by adding the first URL to the second content;
and then, when the client computer is connected to the global information network,
(g) communicating to a server computer that is part of the global information network
the first globally unique persistent identifier, and
the first URL, and
storage location information in the client computer for the first content.

2. The method of claim 1, also comprising:
(h) generating in the client computer not currently connected to the global information network a second globally unique persistent identifier corresponding to the modified second content; and then
(i) generating in the client computer not currently connected to the global information network a second URL corresponding to the second globally unique persistent identifier;
and then, when the client computer is connected to the global information network,
(j) communicating to the server computer that is part of the global information network
the second globally unique persistent identifier, and
the second URL, and
storage location information in the client computer for the modified second content.

3. A method for making content globally findable in a global information network, comprising:
(a) selecting in a client computer a first content corresponding to a first URL; and then
(b) capturing an identity of an authenticated user who selected the first content; and then
(c) selecting a second content in the client computer not currently connected to the global information network whereby the selection of the second content is performed by the authenticated user who selected the first content; and then
(d) in response to the first content selection modifying the second content in the client computer not currently connected to the global information network by adding the first URL to the second content; and then
(e) generating in the client computer not currently connected to the global information network a globally unique persistent identifier corresponding to the modified second content; and then
(f) generating in the client computer not currently connected to the global information network a second URL corresponding to the globally unique persistent identifier;
and then, when the client computer is connected to the global information network,
(g) communicating to the server computer that is part of the global information network
the globally unique persistent identifier, and
the second URL, and
storage location information in the client computer for the modified second content.

4. The method of claim 3, whereby the globally unique persistent identifier and the second URL persistently identify the modified second content if later unchanged.

5. A method for making content globally findable in a global information network, comprising:
(a) selecting a first content in a client computer not currently connected to the global information network; and then
(b) capturing an identity of an authenticated user who selected the first content; and then
(c) generating in the client computer not currently connected to the global information network a first globally unique persistent identifier corresponding to the first content using a hash of the first content whereby the first identifier does not survive modification of the first content; and then
(d) generating in the client computer not currently connected to the global information network a first URL permanently corresponding to the first globally unique persistent identifier; and then
(e) when the client computer is connected to the global information network communicating to a server computer that is part of the global information network
the first globally unique persistent identifier, and
the first URL, and
storage location information in the client computer for the first content.

6. The method of claim 5, also comprising:
(f) selecting a second content in the client computer not currently connected to the global information network whereby the selection of the second content is performed by the authenticated user who selected the first content; and then
(g) generating in the client computer not currently connected to the global information network a second globally unique persistent identifier corresponding to the second content using a hash of the second content whereby the second identifier does not survive modification of the second content; and then
(h) generating in the client computer not currently connected to the global information network a second URL permanently corresponding to the second globally unique persistent identifier;
(i) in response to the selection of the first content modifying the second content in the client computer not currently connected to the global information network by adding to the second content the first URL;
(j) generating in the client computer not currently connected to the global information network a third globally unique persistent identifier corresponding to the modified second content using a hash of the modified second content whereby the third identifier does not survive further modification of modified the second content; and then
(k) generating a third URL corresponding to the second globally unique persistent identifier; and then
and then, when the client computer is connected to the global information network, (l) communicating to the server computer that is part of
the global information network
the second globally unique persistent identifier, and
the second URL, and
storage location information in the client computer for
the second content, and
the third globally unique persistent identifier, and
the third URL, and
storage location information in the client computer for
the modified second content.

* * * * *